US011925584B2

(12) United States Patent
Wei et al.

(10) Patent No.: US 11,925,584 B2
(45) Date of Patent: Mar. 12, 2024

(54) MEDICAL SUSPENSION BRIDGE

(71) Applicant: Maquet (Suzhou) Co., Ltd., Suzhou (CN)

(72) Inventors: Bing Wei, Suzhou (CN); Jiasheng Huang, Suzhou (CN); Jin Xuan, Suzhou (CN); Qunhua Li, Suzhou (CN)

(73) Assignee: Maquet (Suzhou) Co., Ltd., Suzhou (CN)

( * ) Notice: Subject to any disclaimer, the term of this patent is extended or adjusted under 35 U.S.C. 154(b) by 901 days.

(21) Appl. No.: 16/964,824

(22) PCT Filed: Dec. 14, 2018

(86) PCT No.: PCT/CN2018/121088
§ 371 (c)(1),
(2) Date: Jul. 24, 2020

(87) PCT Pub. No.: WO2019/144725
PCT Pub. Date: Aug. 1, 2019

(65) Prior Publication Data

US 2021/0059883 A1 Mar. 4, 2021

(30) Foreign Application Priority Data

Jan. 24, 2018 (CN) ......................... 201810066363.3
Jan. 24, 2018 (CN) ......................... 201810066557.3
(Continued)

(51) Int. Cl.
*A61G 12/00* (2006.01)

(52) U.S. Cl.
CPC ................................. *A61G 12/004* (2013.01)

(58) Field of Classification Search
CPC .... A61G 12/00; A61G 12/002; A61G 12/004; A61G 12/005; A61G 12/007; A61G 12/008; F16M 13/027
See application file for complete search history.

(56) References Cited

U.S. PATENT DOCUMENTS 5,829,723 A 11/1998 Brunner et al.
6,349,436 B1 * 2/2002 Kreuzer ............... A61G 12/004 5/85.1

(Continued)

FOREIGN PATENT DOCUMENTS

CN 201710581 U 1/2011
CN 102269229 A 12/2011

(Continued)

OTHER PUBLICATIONS

Japan Patent Office. Notice of Reasons for Refusal for application 2020-540615. dated May 31, 2021. With translation. 12 pages.

(Continued)

*Primary Examiner* — Zachary L Kuhfuss
*Assistant Examiner* — Cheng Lin
(74) *Attorney, Agent, or Firm* — Quarles & Brady LLP

(57) ABSTRACT

A medical suspension bridge includes a cross beam, a suspension pipe and a moving module. The cross beam is connected with the suspension pipe. The moving module is movably connected with the cross beam. The cross beam includes a load-bearing beam. The moving module includes a cable carrier moving plate extending to the upper portion of the load-bearing beam. The medical suspension bridge further includes a cable carrier. One end of the cable carrier is connected to the load-bearing beam, and the other end is connected to the cable carrier moving plate. Since cables such as electric wires and air pipes within a box body which needs to be moved are collectively mounted within the cable (Continued)

carrier, not only the routing is more tidy, but also the cables can be well protected.

12 Claims, 25 Drawing Sheets

(30) Foreign Application Priority Data

| | | |
|---|---|---|
| Jan. 24, 2018 | (CN) | 201810067702.X |
| Feb. 6, 2018 | (CN) | 201810117493.5 |

(56) References Cited

U.S. PATENT DOCUMENTS

| | | | | |
|---|---|---|---|---|
| 7,254,850 | B2 | 8/2007 | Newkirk | |
| 7,770,860 | B1 * | 8/2010 | Culpepper | F16M 11/2014 248/324 |

FOREIGN PATENT DOCUMENTS

| | | | | | |
|---|---|---|---|---|---|
| CN | 103181823 | A | | 7/2013 | |
| CN | 103912609 | A | | 7/2014 | |
| CN | 204050147 | U | * | 12/2014 | |
| CN | 204050147 | U | | 12/2014 | |
| CN | 105167850 | A | * | 12/2015 | |
| CN | 204839735 | U | | 12/2015 | |
| CN | 205307104 | U | | 6/2016 | |
| CN | 205569248 | U | | 9/2016 | |
| CN | 205729694 | U | * | 11/2016 | |
| CN | 205729694 | U | | 11/2016 | |
| CN | 205729695 | U | * | 11/2016 | A61G 12/004 |
| CN | 205729695 | U | | 11/2016 | |
| CN | 206362548 | U | | 7/2017 | |
| CN | 108066090 | A | | 5/2018 | |
| CN | 108087459 | A | | 5/2018 | |
| CN | 108175622 | A | | 6/2018 | |
| CN | 108194539 | A | | 6/2018 | |
| CN | 207777462 | U | | 8/2018 | |
| CN | 208442182 | U | | 1/2019 | |
| DE | 29608033 | U1 | | 8/1996 | |
| JP | H07308348 | A | | 11/1995 | |
| WO | 2013036417 | A1 | | 3/2013 | |
| WO | WO-2015062367 | A1 | * | 5/2015 | A61G 12/004 |

OTHER PUBLICATIONS

European Patent Office, Extended Search Report, Application No. 18903024.0, dated Sep. 3, 2021, 8 pages.

International Searching Authority. International Search Report and Written Opinion for application PCT/CN2018/121088. dated Feb. 27, 2019. With Translation.

* cited by examiner

MEDICAL SUSPENSION BRIDGE

CROSS-REFERENCE TO RELATED APPLICATIONS

This application represents the U.S. national stage entry of International Application No. PCT/CN2019/121088 filed Dec. 14, 2018, which claims priority to Chinese Application No. 201810066557.3 filed Jan. 24, 2018, No. 201810066363.3 filed Jan. 24, 2018, No. 201810067702.X filed Jan. 24, 2018, and No. 201810117493.5 filed Feb. 6, 2018, the disclosure of which is incorporated herein by reference in its entirety and for all purposes.

TECHNICAL FIELD

The application relates to a medical suspension bridge.

BACKGROUND ART

In the existing medical suspension bridge, since a suspension bridge terminal box body (hereinafter referred to as the box body) containing electric and air terminals is mounted at the lower portion, this box body will move along a suspension bridge guide rail, so how to manage cables and air pipes coming out of the box body becomes very important. At present, there are two major kinds of cable routing passages, including suspension bridge backpack type external routing and routing by forming holes in the middle portion of a load-bearing beam of the suspension bridge. The appearance of the first type is not attractive enough, the holes in the second type have a great influence on the strength and rigidity of the whole suspension bridge, the processing amount is great and the cost is great.

SUMMARY

Aiming at the above defects in the prior art, one purpose of the application is to provide a tidily routed medical suspension bridge, so as to facilitate the management of cables and protect the cables to a certain extent.

In order to realize the above purpose of the application, the application adopts the following technical solution: a medical suspension bridge includes a cross beam, a suspension pipe, a moving module and a box body connected with the moving module, the cross beam is connected with the suspension pipe, the moving module is movably connected with the cross beam, the medical suspension bridge further includes a cable carrier, electric wires and air pipes, the cross beam includes a load-bearing beam, the moving module includes a cable carrier moving plate extending to the upper portion of the load-bearing beam, one end of the cable carrier is connected to the load-bearing beam, the other end is connected to the cable carrier moving plate, and the electric wires and the air pipes enter the suspension pipe through the moving module and the cable carrier from the inside of the box body.

In addition, the application further includes the following additional technical solution:

The cross beam further includes a rear panel assembly connected to one side of the load-bearing beam.

The rear panel assembly includes a rear cover plate connecting plate connected with the load-bearing beam, the load-bearing beam is provided with an outwards convex extension part, the rear cover plate connecting plate is provided with an outwards convex fitting part, and the fitting part and the extension part are connected with each other in a clamping manner.

A first groove is provided in the fitting part, a second groove is provided in the extension part, the first groove and the second groove run through each other to jointly form a first routing groove that avoids the cable carrier moving plate, and the cable carrier moving plate extends through the first routing groove to the upper portion of the load-bearing beam.

Two dustproof strips which jointly seal the first routing groove are mounted at the first routing groove.

The rear panel assembly further includes a rear cover plate and a rear panel, the rear cover plate, the rear cover plate connecting plate and the rear panel are connected with one another in a clamping manner, and a rear inner cavity is formed among the rear cover plate, the rear cover plate connecting plate and the rear panel.

The cross beam further includes a front panel assembly connected to the other side of the load-bearing beam, the front panel assembly includes a front cover plate and a front panel connected with each other in a clamping manner, and the front cover plate and the front panel fit with each other to form a front inner cavity.

The rear panel assembly includes a rear cover and a rear cover connecting plate connected with each other in a clamping manner, the rear cover connecting plate is provided with a side plate, the side plate is provided with a second routing groove that avoids the cable carrier moving plate, and one end of the cable carrier moving plate extends through the second routing groove to the upper portion of the load-bearing beam.

The two sides of the cable carrier moving plate are connected with roller assemblies, a flexible dustproof belt covering the second routing groove is mounted on the side portion, and the flexible dustproof belt passes through the roller assemblies and semi-encloses the outside of the cable carrier moving plate.

Each roller assembly includes a roller support frame and at least one dustproof belt roller mounted on the roller support frame.

Compared with the prior art, the application has the following advantages:

1. Since cables such as electric wires and air pipes within the box body which needs to be moved are collectively mounted within the cable carrier, not only the routing is more tidy, but also the cables can be well protected.
2. Since the front inner cavity and the rear inner cavity for routing and arranging are provided, the arrangement in the front inner cavity and the rear inner cavity is clear and tidy, and is not easily confused.
3. Since the middle portion of the load-bearing beam is not provided with a groove for routing, the influence on the overall strength of the cross beam is smaller and the length of the groove can be increased, so as to prolong the moving distance of the lower box body and facilitate the use.
4. The sealing performance is good, the dustproof effect is good and no influence is caused to the movement of the moving module.
5. Since electric wires, air pipes and the like are all collected in the medical suspension bridge, the appearance is attractive.

In addition, the application further provides the following additional technical solution:

The medical suspension bridge further includes a rotating mechanism, a shaft seat and a suspension arm, the suspension arm is rotatably connected to the shaft seat through the rotating mechanism, the rotating mechanism includes a rotating shaft and a plastic shaft sleeve, the plastic shaft sleeve is connected to the rotating shaft, the shaft seat is partially embedded in the plastic shaft sleeve, and the rotating shaft drives the suspension arm to rotate relative to the shaft seat.

The rotating shaft includes an upper shaft member and a lower shaft member connected with the upper shaft member.

The rotating mechanism of the medical suspension bridge further includes a tensioning device, and the tensioning device is connected between the upper shaft member and the lower shaft member.

The tensioning device includes a tensioning screw, a disc spring assembly and a gasket, the tensioning device passes through the upper shaft member and is connected with the lower shaft member, and the disc spring assembly and the gasket are provided on the tensioning screw in a sleeving manner.

The gasket includes a first gasket and a second gasket, and the first gasket and the second gasket are respectively provided at the two ends of the disc spring assembly, and respectively press against a nut of the tensioning screw and the upper shaft member.

The plastic shaft sleeve includes an upper shaft sleeve, and the upper shaft sleeve is provided between the rotating shaft and the shaft seat.

The plastic shaft sleeve further includes a lower shaft sleeve, the lower shaft sleeve is provided between the rotating shaft and the shaft seat, and the lower shaft sleeve and the upper shaft sleeve are symmetrically provided.

The rotating mechanism of the medical suspension bridge further includes a friction device, one end of the friction device is fixedly connected with the rotating shaft, and the other end presses against the plastic shaft sleeve.

The rotating mechanism of the medical suspension bridge further includes an ejection device, the ejection device is provided in the upper shaft member, and one end of the ejection device presses against the lower shaft member.

The rotating mechanism of the medical suspension bridge further includes a limiting screw and a limiting block, the limiting screw is connected with the rotating shaft, and the limiting block is provided on the shaft seat.

Compared with the prior art, the application has the advantages that the rotating mechanism of the medical suspension bridge provided by the application uses the plastic shaft sleeve to replace the metal bearing, the cost is reduced, and the rotation tightness can be adjusted.

In addition, the application further provides the following additional technical solution:

The medical suspension bridge further includes an airbag brake mechanism, the airbag brake mechanism includes a guide rail, a moving module movably connected to the guide rail and an airbag brake module fixedly connected with the moving module, the guide rail is provided with guide rail grooves, the airbag brake module includes an airbag brake located in the guide rail grooves, each guide rail groove includes an upper sidewall and a lower sidewall which are provided opposite to each other, and the airbag brake tightly presses against the upper sidewall and the lower sidewall during braking.

The airbag brake includes a base, and an upper airbag and a lower airbag respectively provided at the upper portion and lower portion of the base.

The upper airbag after being inflated tightly presses against the upper sidewall.

The lower airbag after being inflated tightly presses against the lower sidewall.

The medical suspension bridge further includes an air source, an electromagnetic valve and an air pipe, the air source is connected with the upper airbag and the lower airbag through the air pipe, and the electromagnetic valve is provided on the air pipe to control the inflation and deflation of the upper airbag and the lower airbag.

The airbag brake module includes an airbag brake support frame fixedly connected to the moving module, and the airbag brake is mounted on the airbag brake support frame.

The airbag brake is movably connected with the airbag brake support frame.

The airbag brake module further includes a shaft shoulder screw, an elongated hole is provided in the airbag brake support frame, and the shaft shoulder screw passes through the elongated hole and is connected with the airbag brake.

The shaft shoulder screw includes a shaft shoulder in sliding fit with the elongated hole.

The base is not in contact with the lower sidewall.

Compared with the prior art, the application has the following advantages:

1. When braking, the airbag brake mechanism of the application has two airbag surfaces squeezing the guide rail grooves, so the friction force is larger, the braking effect is better, and the unexpected drift of the moving module is effectively prevented.
2. The airbag brake mechanism of the application is float-connected to the airbag brake support frame, the requirements on the size and mounting accuracy of the guide rail and the airbag brake are low, and it is more convenient and reliable to use.
3. The friction noise is low when the moving module of the application moves.

In addition, the application further provides the following additional technical solution:

The medical suspension bridge further includes an electromagnetic brake mechanism, the electromagnetic brake mechanism includes a guide rail, a moving module movably connected to the guide rail and an electromagnetic brake module fixedly connected with the moving module, the guide rail is provided with guide rail grooves, and the electromagnetic brake module includes an electromagnetic brake located in the guide rail grooves.

Each guide rail groove includes an upper sidewall and a lower sidewall provided opposite to each other, the electromagnetic brake includes an upper armature, a lower armature and a compression spring provided between the upper armature and the lower armature, the upper armature is capable of pressing against the upper sidewall under the elastic force of the compression spring, and the lower armature is capable of pressing against the lower sidewall under the elastic force of the compression spring.

The electromagnetic brake further includes a coil, and the coil after being electrified is capable of attracting the upper armature and the lower armature to separate the upper armature and the lower armature from the upper sidewalls and the lower sidewalls of the guide rail grooves.

The upper armature and the lower armature are respectively provided with an upper friction plate and a lower friction plate.

The electromagnetic brake module further includes an electromagnetic brake support frame fixedly connected to the guide rail, and the electromagnetic brake is mounted on the electromagnetic brake support frame.

The electromagnetic brake is movably connected with the electromagnetic brake support frame.

The electromagnetic brake module further includes a shaft shoulder screw, an elongated hole is provided in the electromagnetic brake support frame, and the shaft shoulder screw passes through the elongated hole and is connected with the electromagnetic brake.

The shaft shoulder screw includes a shaft shoulder in sliding fit with the elongated hole.

The electromagnetic brake includes a base and a ball plunger mounted on the base. When the coil is electrified, the ball plunger presses against the lower sidewalls of the guide rail grooves.

The moving module includes moving rollers and the moving rollers fit with the guide rail grooves.

Compared with the prior art, the application has the following advantages:

1. In the medical suspension bridge provided by the application, by changing the traditional airbag brake into the electromagnetic brake, the response speed is fast, the use reliability is high, it is not easily damaged, the service life is longer, no compressed air is used to drive, the structure is simple and the volume is small.
2. Since the electromagnetic brake mechanism of the application is provided with the upper armature and the lower armature, which can press against the guide rail grooves to play a role of braking, the braking effect is better than that of a unilateral armature.
3. Since the electromagnetic brake of the application is movably connected with the electromagnetic brake support frame, the requirements on the size and mounting accuracy of the guide rail and the electromagnetic brake are low, and it is more convenient and reliable to use.
4. Since the friction plate is not in contact with the guide rail when the moving module moves, the friction noise is low.

DESCRIPTION OF THE EMBODIMENTS

The technical solution of the application will be further non-restrictively described below in detail in combination with the preferred embodiments with reference to the drawings.

Embodiment 1

Figure 1:
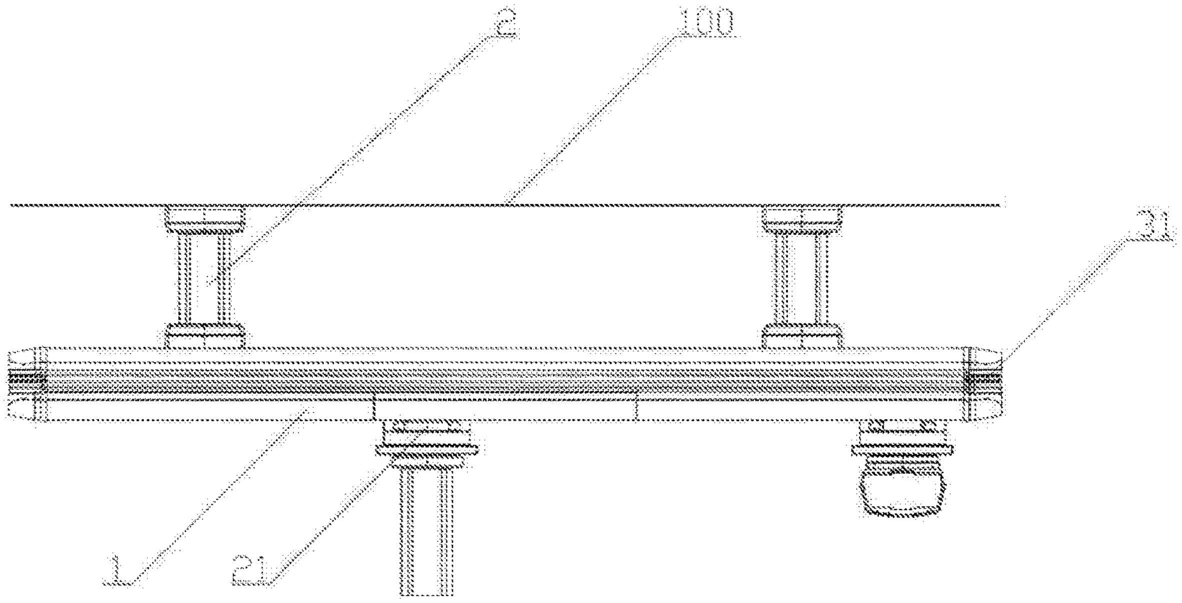
FIG. 1 is a schematic structural view of a medical suspension bridge in embodiment 1 of the application.

Referring to FIG. 1, it illustrates a medical suspension bridge according to one preferred embodiment of the application. The medical suspension bridge includes a cross beam 1, suspension pipes 2 and a moving module 21. One ends of the suspension pipes 2 are connected with a ceiling 100, and the other ends are connected with the cross beam 1. The number of the suspension pipes 2 is preferably two. The moving module 21 is movably connected to the cross beam 1, and the lower portion may be connected with a suspension bridge terminal box body (not shown, hereinafter referred to as the box body) containing electric and air terminals.

Figure 2:
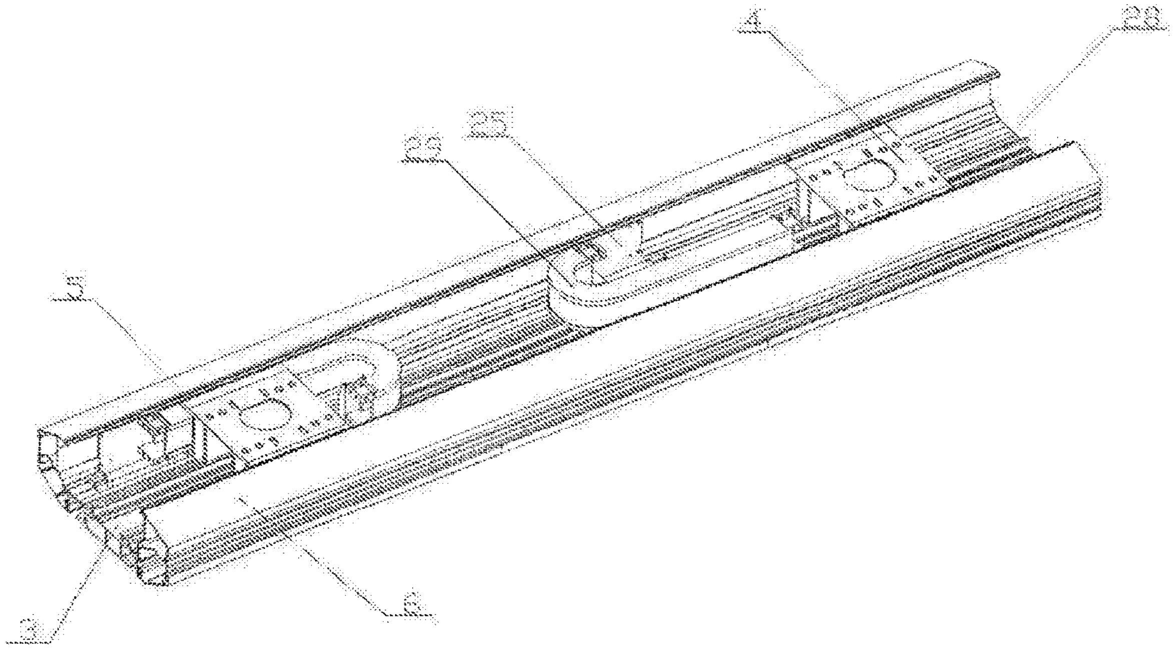
FIG. 2 is a schematic structural view of a cross beam of the medical suspension bridge in embodiment 1 of the application.
Figure 3:
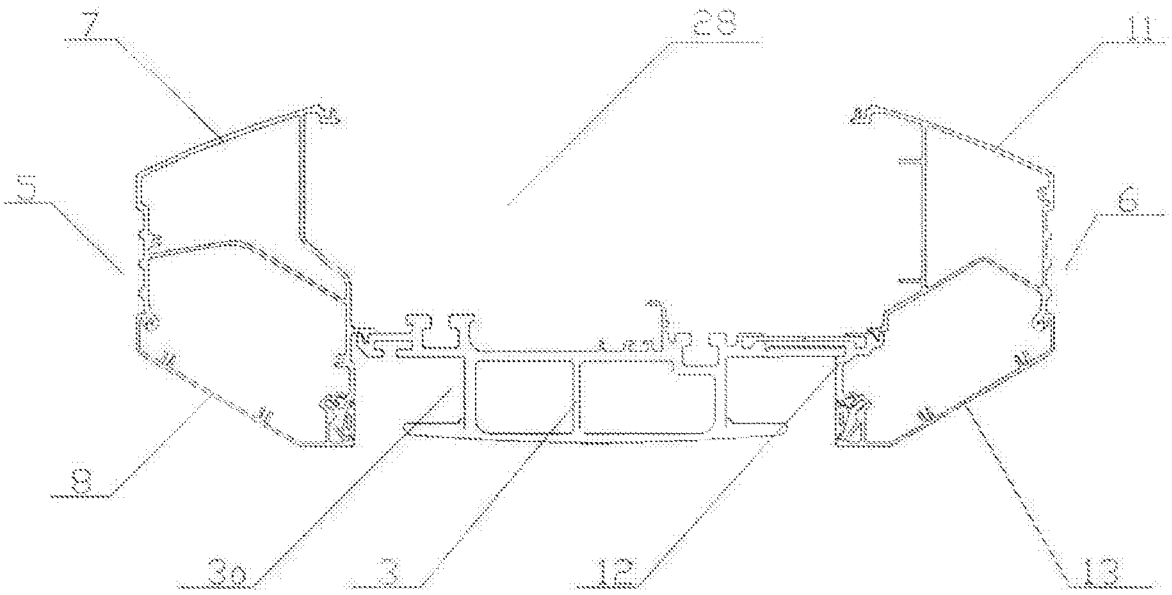
FIG. 3 is a cross-sectional view of the cross beam of the medical suspension bridge in embodiment 1 of the application.
Figure 4:
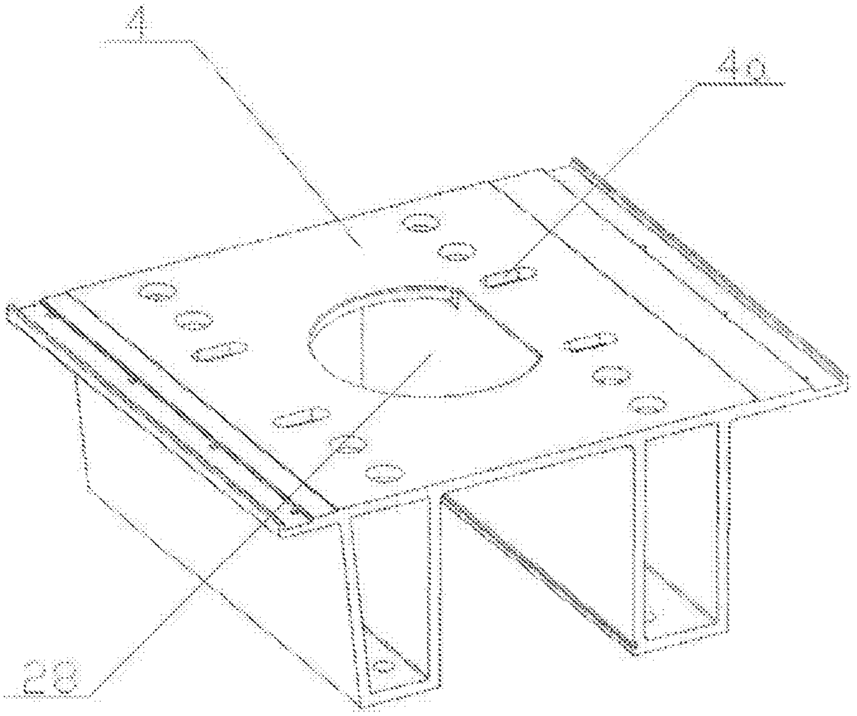
FIG. 4 is a schematic structural view of a connecting section in embodiment 1 of the application.
Figure 5:
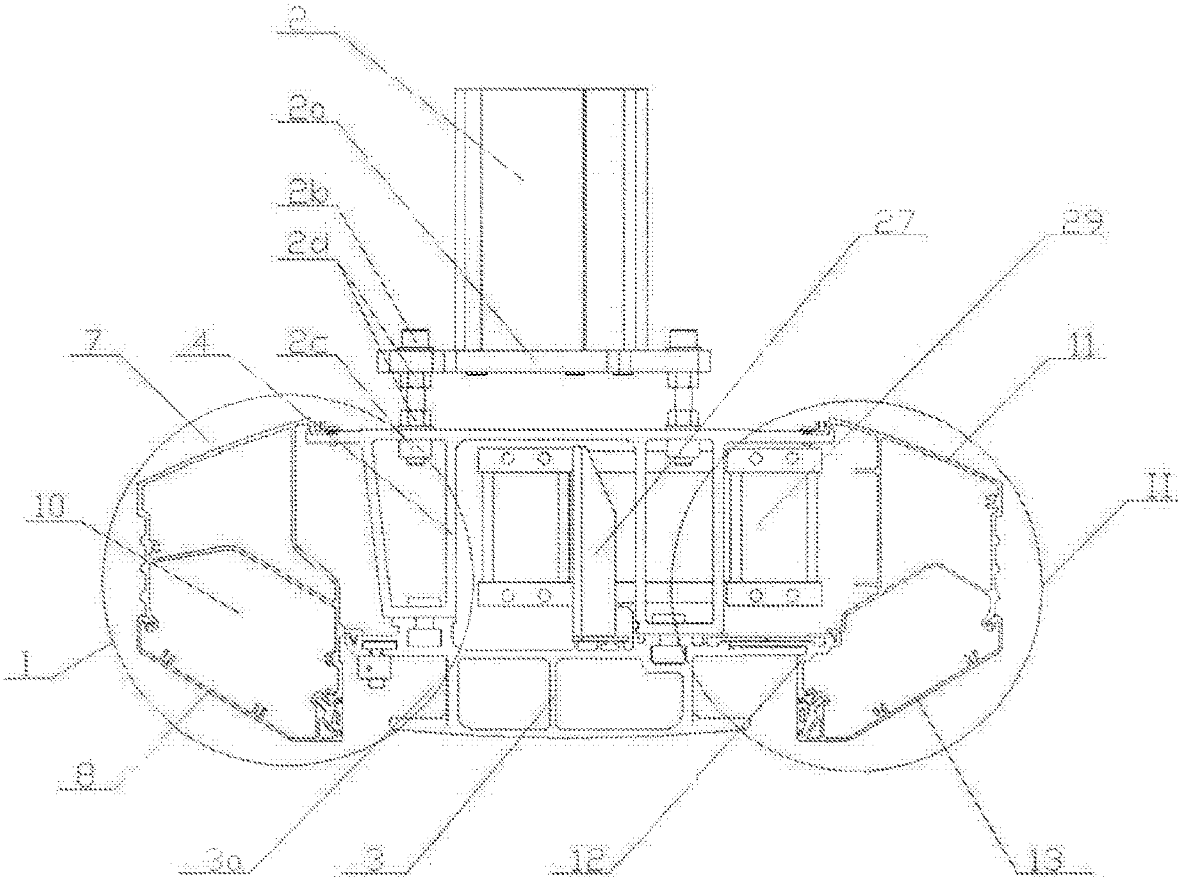
FIG. 5 is a cross-sectional view of the medical suspension bridge in embodiment 1 of the application before a moving module is mounted.

Referring to FIG. 2 and FIG. 3, the cross beam 1 includes a load-bearing beam 3, connecting sections 4, a front panel assembly 5, a rear panel assembly 6, and end covers 31. A cavity 28 is formed among the load-bearing beam 3, the front panel assembly 5 and the rear panel assembly 6, and the connecting sections 4 are provided in the cavity 28. The end covers 31 are located at the two ends of the cross beam 1, can protect the parts in the cavity 28 and can play a role of sealing, dust prevention, and appearance improvement.

Referring to FIG. 4 to FIG. 8, the upper ends of the connecting sections 4 are connected with the suspension pipes 2, and the lower ends are connected with the load-bearing beam 3. In the present embodiment, two connecting sections 4 are provided corresponding to the number of the suspension pipes 2. The connection mode of the connecting sections 4 and the suspension pipes 2 is as follows: four elongated holes 4*a* along the width direction of the medical suspension bridge are provided in the upper surfaces of the connecting sections 4, a connecting plate 2*a* is connected below the suspension pipes 2, four through holes (not shown) corresponding to the four elongated holes 4*a* are provided in the connecting plate 2*a*, and adjusting screws 2*b* pass through the through holes and the elongated holes 4*a*, and are connected with nuts 2*c* under the adjusting screws 2*b*, so as to connect the connecting plate 2*a* with the connecting sections 4. Moreover, the height and levelness of the cross beam 1 can be adjusted through the adjusting screws 2*b*, and the position of the cross beam 1 relative to the width direction of the suspension pipes 2 can be adjusted through the elongated holes. In order to enhance the stability of the connection, two more adjusting nuts 2*d* may be provided on the adjusting screws 2*b*, one of which fits with the lower surface of the connecting plate 2*a*, and the other fits with the upper surface of the connecting section 4. The upper portion of the connecting section 4 is provided with an opening 4*b* for routing which is communicated with the suspension pipe 2; the lower portion of the connecting section 4 is connected with the load-bearing beam 3 through bolts.

The front panel assembly 5 and the rear panel assembly 6 are respectively provided on the left side and right side of the cross beam 1.

Figure 6:
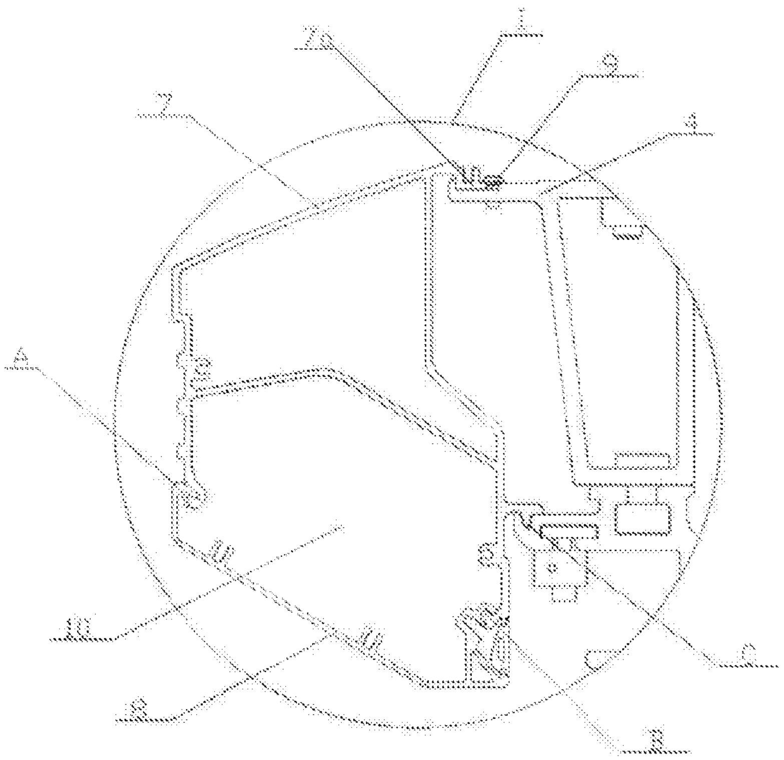
FIG. 6 is an enlarged view of position I in FIG. 5.

The front panel assembly 5 includes a front cover plate 7 and a front panel 8 which are connected with each other in a clamping manner. Referring to FIG. 6, the front cover plate 7 and the front panel 8 are respectively connected in a clamping manner through a first clamping part A and a second clamping part B. In addition to clamping, the connection of the front cover plate 7 and the front panel 8 may be supplemented with screw connection (not shown) to make the connection more firm. The upper portion of the front cover plate 7 is provided with an outwards convex first connecting part 7*a*, and the first connecting part 7*a* is connected with the upper surfaces of the connecting sections 4 through screws 9; the lower portion of the front cover plate 7 is connected with the upper surface of the load-bearing beam 3 through a third clamping part C.

A front inner cavity 10 is formed between the front cover plate 7 and the front panel 8. Devices such as an electric socket, an air port and an LED lamp may be fixed on the front panel 8. The front inner cavity 10 may accommodate electric wires, air pipes and the like to provide a routing passage.

Figure 7:
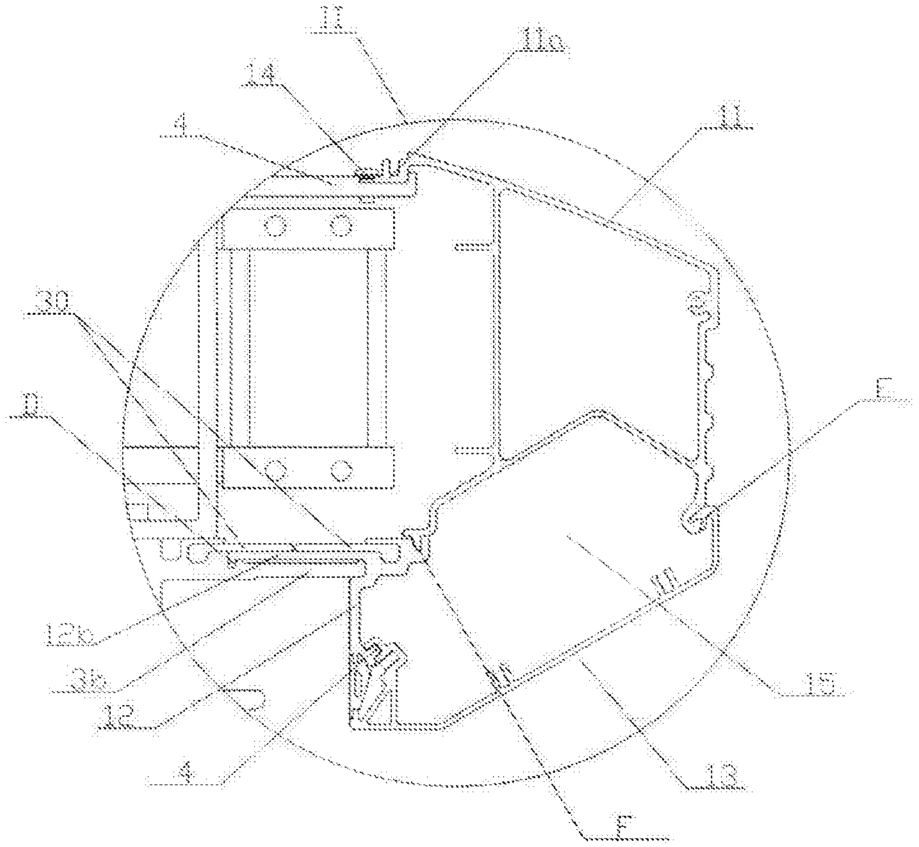
FIG. 7 is an enlarged view of position II in FIG. 5.
Figure 8:
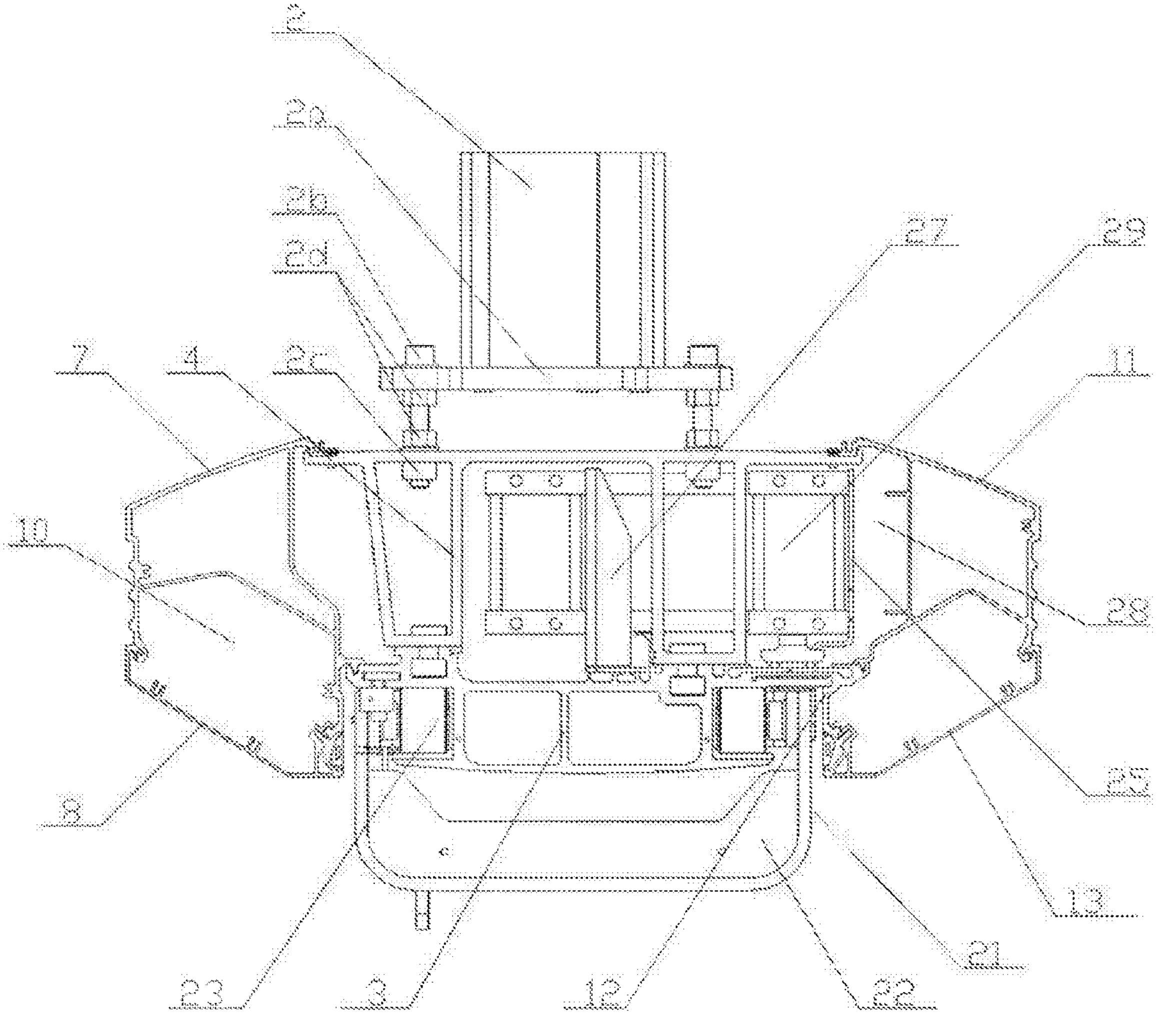
FIG. 8 is a cross-sectional view of the medical suspension bridge in embodiment 1 of the application after a moving module is mounted.

The rear panel assembly 6 includes a rear cover plate 11, a rear cover plate connecting plate 12 and a rear panel 13 which are connected with one another in a clamping manner. Referring to FIG. 7, the load-bearing beam 3 is provided with an outwards convex extension part 3*b*, the rear cover plate connecting plate 12 is provided with an outwards convex fitting part 12*b*, and the fitting part 12*b* is connected with the extension part 3*b* in a clamping manner through a fourth clamping part D; the upper portion of the rear cover plate 11 is provided with an outwards convex second connecting part 11*a*, and the second connecting part 11*a* is connected with the upper surfaces of the connecting sections 4 through screws 14; one end of the rear panel 13 is connected with the rear cover plate 11 in a clamping manner through a fifth clamping part E, and the other end is connected with the rear cover plate connecting plate 12 in a clamping manner through a sixth clamping part F. Similarly, in addition to clamping among the rear cover plate 11, the rear cover plate connecting plate 12 and the rear panel 13, the connection may be supplemented with screw connection (not shown) to make the connection more firm.

A rear inner cavity 15 is formed among the rear cover plate 11, the rear cover plate connecting plate 12 and the rear panel 13. Devices such as an electric socket, an air port and an LED may be fixed on the rear panel 13, and the rear inner cavity 15 may accommodate electric wires, air pipes and the like to provide a routing passage.

Figure 9:
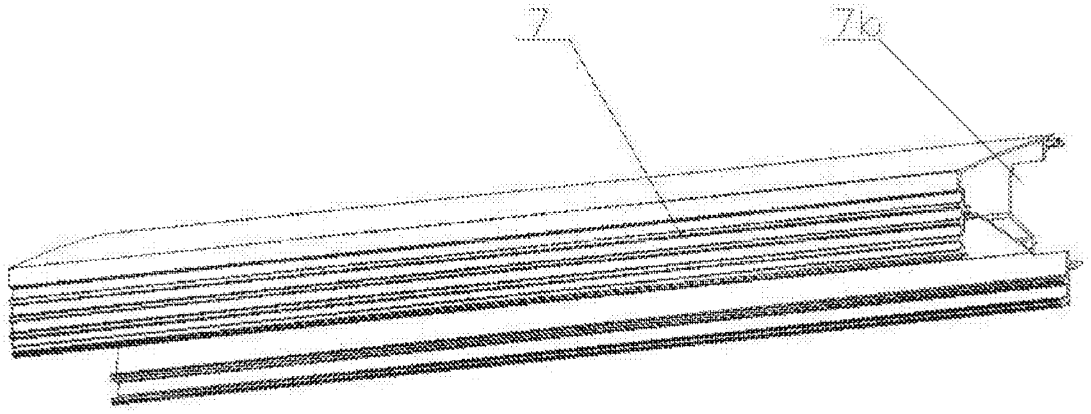
FIG. 9 is a schematic structural view of a front cover plate of the medical suspension bridge in embodiment 1 of the application.

Referring to FIG. 9, a first notch 7*b* is provided in the end portion of the front cover plate 7. The first notch 7*b* enables the front inner cavity 10 and the cavity 28 to be communicated. The first notch 7*b* may be provided in only one end of the front cover plate 7 or in the two ends of the front cover plate 7 for the electric wires, air pipes and other parts in the front inner cavity 10 to enter the cavity 28 through the first notch 7*b*, and then enter the ceiling 100 through the opening 4*b* and the suspension pipes 2 at last. The rear cover plate 11 adopts the same structure as the front cover plate 7, that is, a second notch is provided in the end portion to make the electric wires, air pipes and other lines in the rear inner cavity 15 enter the cavity 28. By adopting such routing, the electric wires, air pipes and the like will not be exposed, such that the appearance is more attractive.

Figure 10:
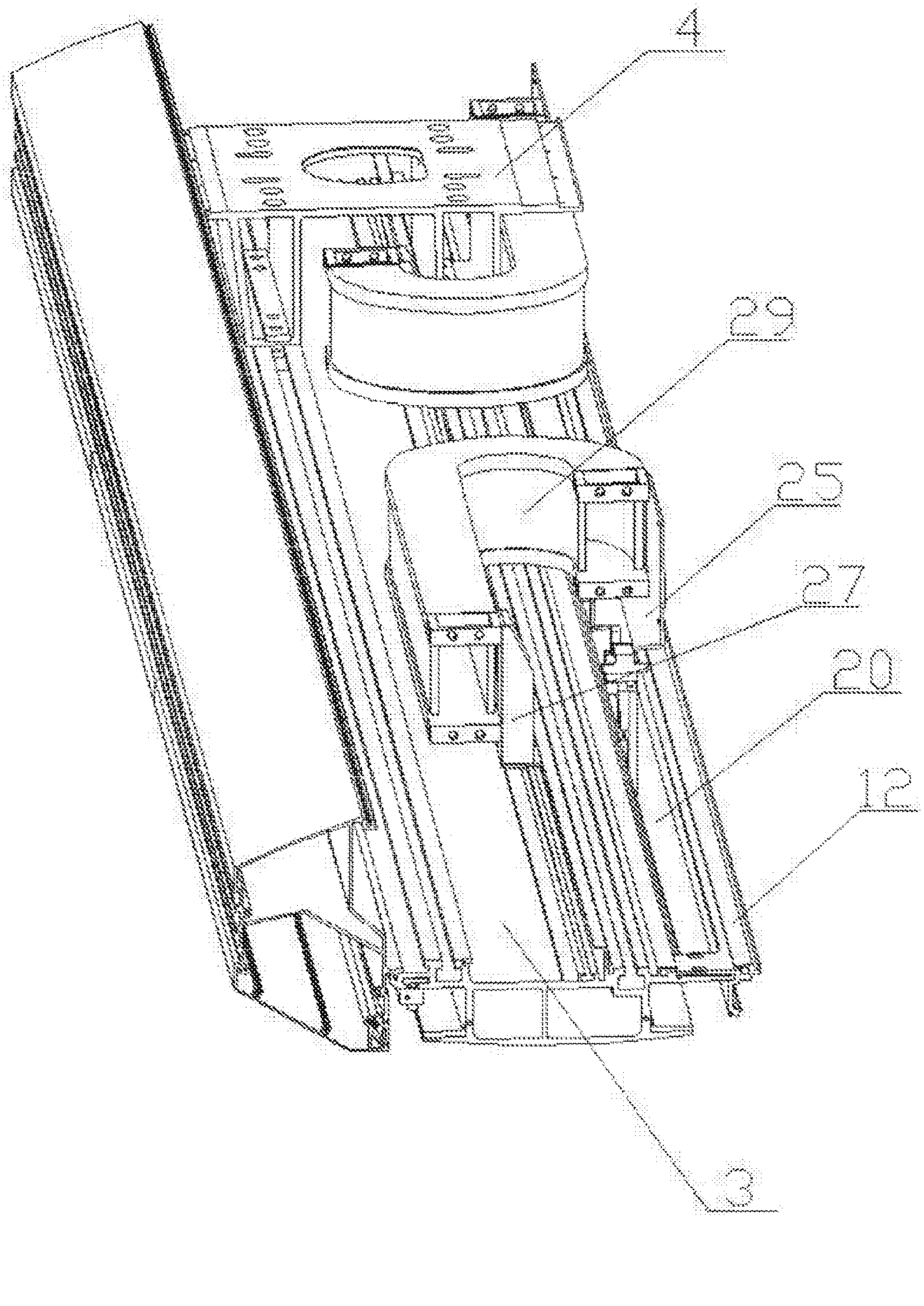
FIG. 10 is a schematic view of a first routing groove of the medical suspension bridge in embodiment 1 of the application.
Figure 11:
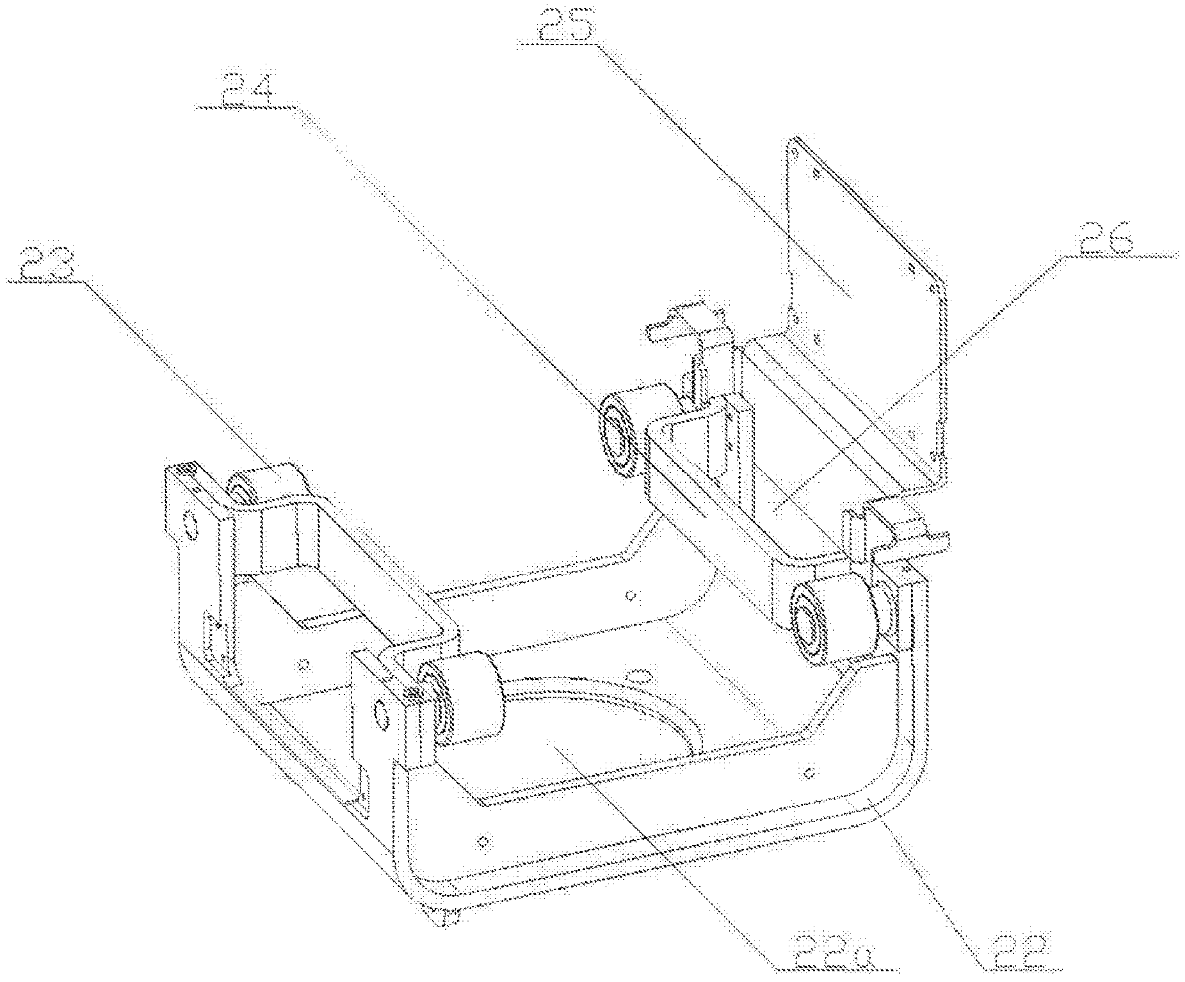
FIG. 11 is a schematic structural view of a moving module of the medical suspension bridge in embodiment 1 of the application.
Figure 12:
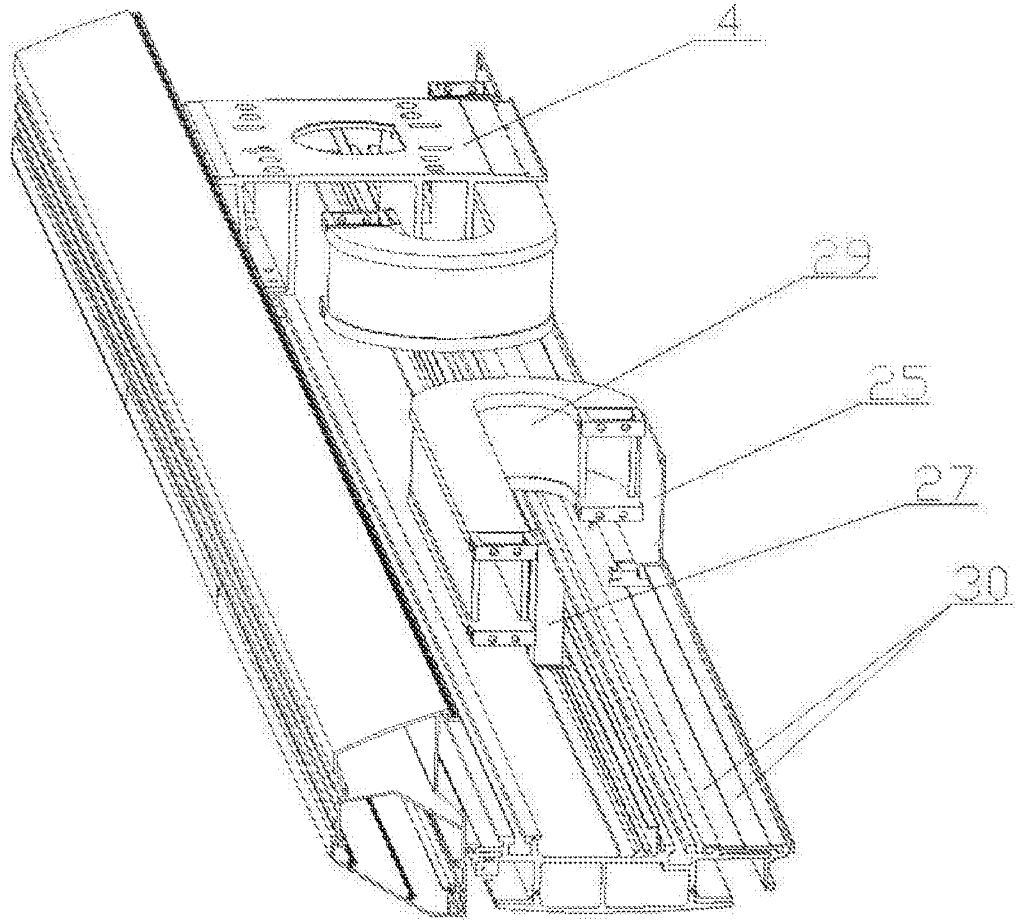
FIG. 12 is a schematic structural view after dustproof strips are mounted at the first routing groove in FIG. 10.
Figure 13:
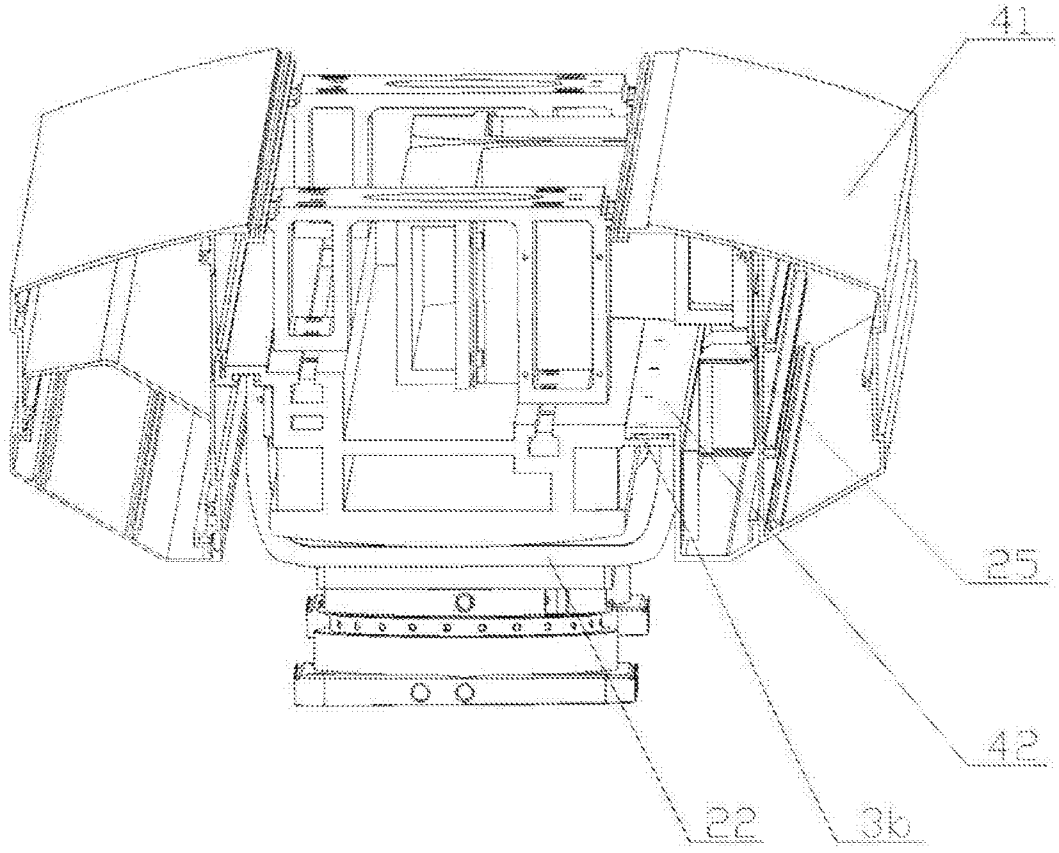
FIG. 13 is a schematic structural view of a medical suspension bridge in embodiment 2 of the application.
Figure 14:
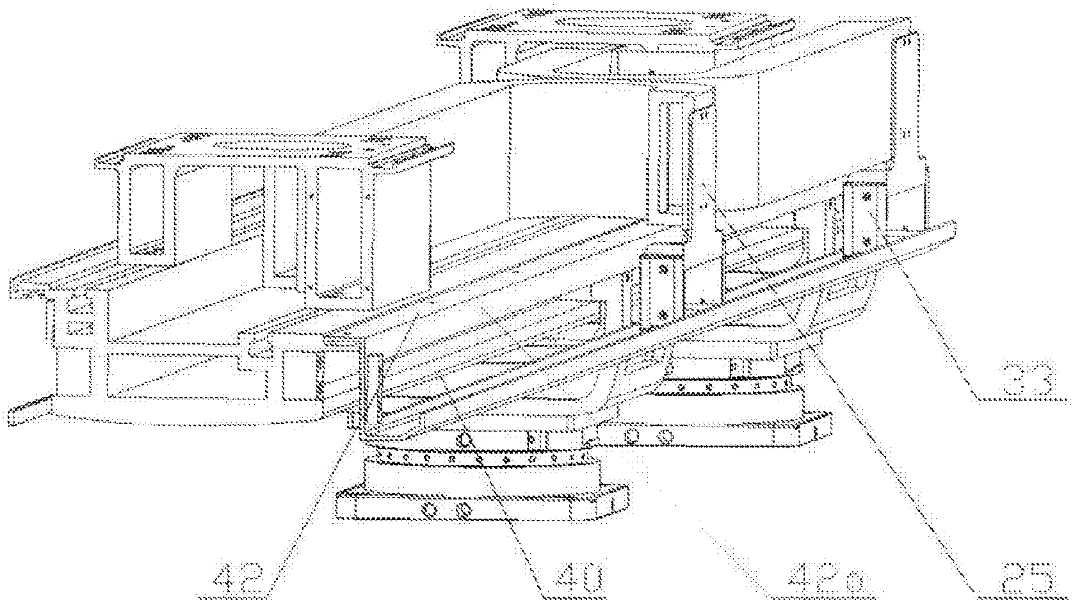
FIG. 14 is a schematic structural view after a front panel assembly and a rear cover are removed in FIG. 13.
Figure 15:
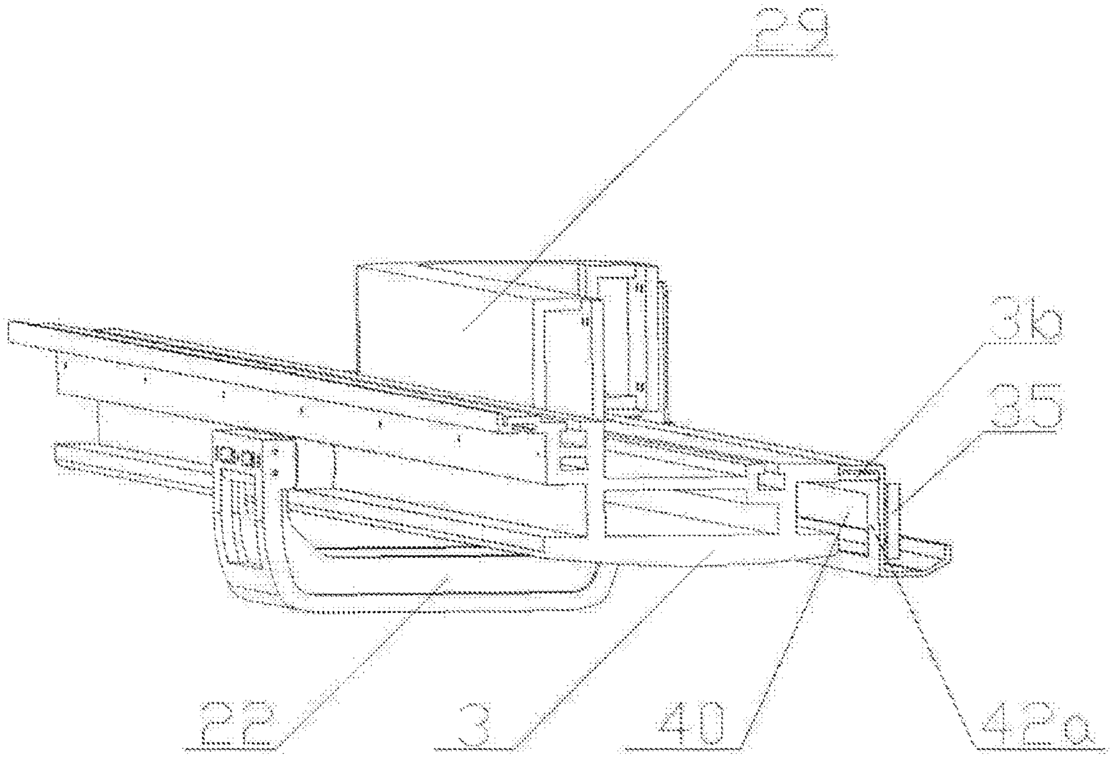
FIG. 15 is a schematic structural view of a second routing groove in embodiment 2 of the application.
Figure 16:
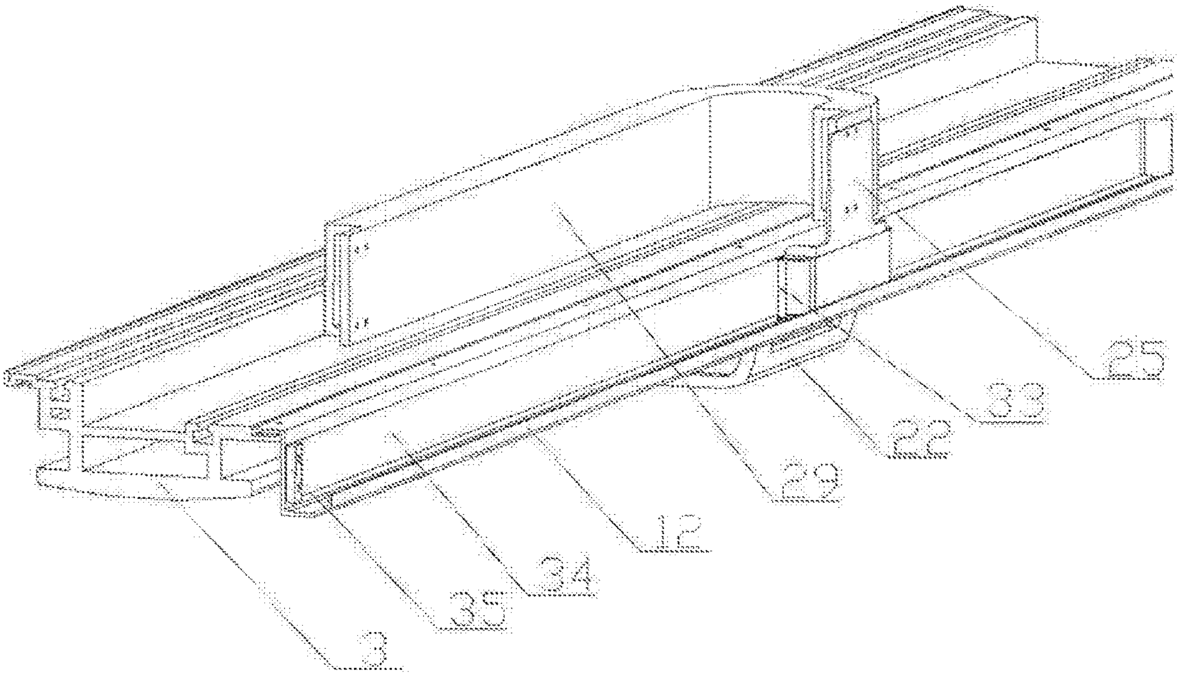
FIG. 16 is a schematic structural view after sealing strips are mounted on the second routing groove in embodiment 2 of the application.
Figure 17:
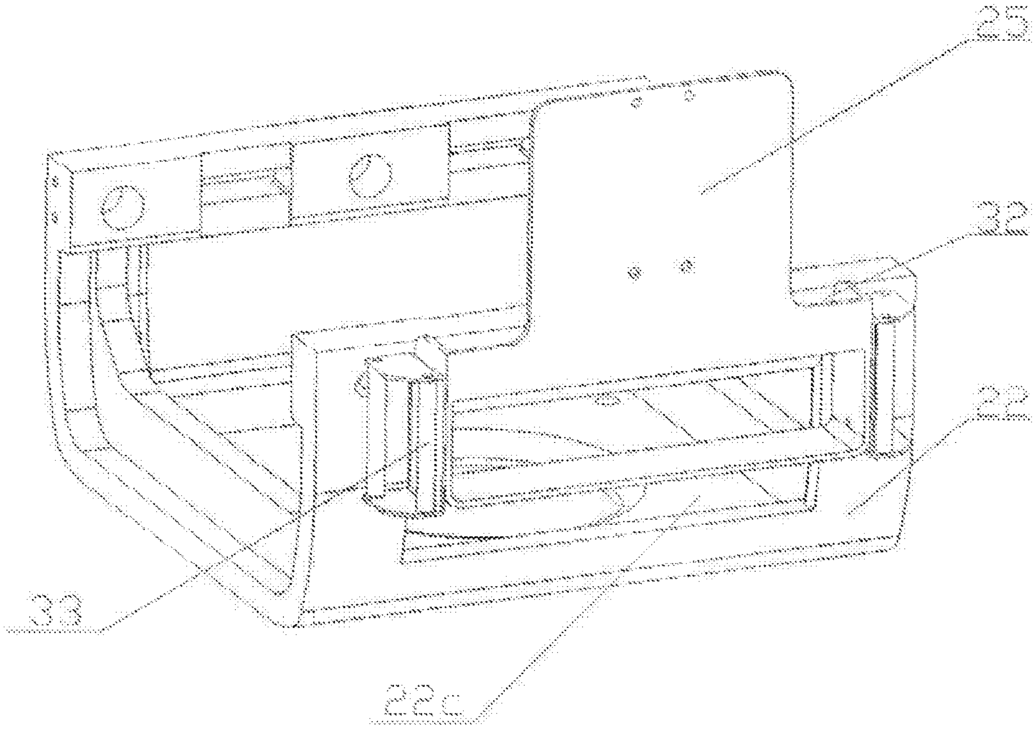
FIG. 17 is a schematic structural view of a moving module in FIG. 16.
Figure 18:
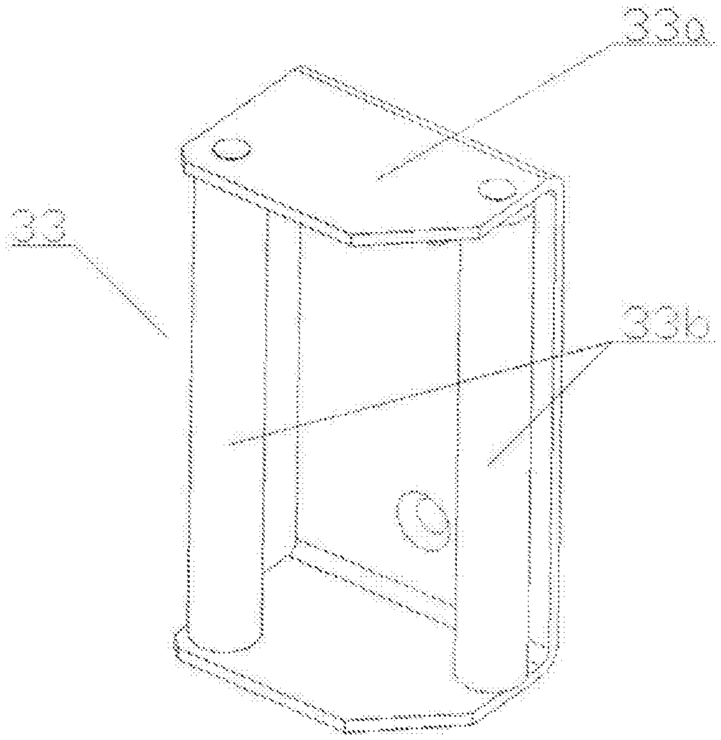
FIG. 18 is schematic structural view of a roller assembly in embodiment 2 of the application.
Figure 19:
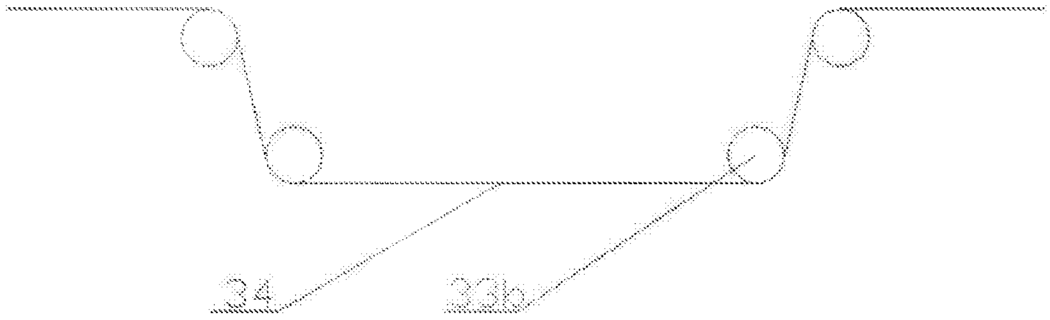
FIG. 19 is a schematic view of a flexible dustproof belt provided between dustproof belt rollers in embodiment 2 of the application.

Referring to FIG. 10 to FIG. 12, a first groove along the length direction of the cross beam 1 is provided in the fitting part 12*b* of the rear cover plate connecting plate 12, and a second groove with a size and shape consistent with the size and shape of the first groove and communicated with the first groove is provided in the extension part 3*b* of the load-bearing beam 3. The first groove and the second groove jointly form a first routing groove 20 that avoids a cable carrier moving plate 25, and the cable carrier moving plate 25 extends through the first routing groove 20 into the cavity 28. Guide rail grooves 3*a* are provided in the two sides of the load-bearing beam 3. The moving module 21 includes a moving frame 22, a roller 23 connected to the moving frame 22, a routing rack 24 and a cable carrier moving plate 25. The rollers 23 are provided in the guide rail grooves 3*a*, and the moving module 21 can freely move along the cross beam 1 through the roller 23. A routing hole 26 is formed among the routing rack 24, the moving frame 22 and the cable carrier moving plate 25. A through hole 22*a* is provided in the bottom surface of the moving frame 22.

One end of the cable carrier moving plate 25 is connected with the moving frame 22, and the other end passes through the first routing groove 20 and extends into the cavity 28. The medical suspension bridge further includes a cable carrier 29 for routing, the cable carrier 29 is mounted in the cavity 28, one end of the cable carrier 29 is connected with the cable carrier moving plate 25, and the other end is connected with a cable carrier fixed plate 27 which is fixedly connected with the load-bearing beam 3. When the moving frame 22 moves, the cable carrier moving plate 25 can be driven to move, thus driving the cable carrier 29 to move.

Electric wires, air pipes and the like sequentially pass through the through hole 22*a* and the routing hole 26 from the inside of the box body to enter the cable carrier 29, then sequentially pass through the cable carrier 29, the opening 4*b* and the suspension pipes 2, and finally enter the ceiling 100.

Two dustproof strips 30 which jointly seal the first routing groove 20 are mounted at the first routing groove 20, and the junction of the two dustproof strips 30 is approximately located in the middle portion of the first routing groove 20. The dustproof strips 30 are mounted on the upper surface of the rear cover plate connecting plate 12, and the mounting mode is preferably clamping. At the routing hole 26 of the moving frame 22, the electric wires, the air pipes and the cable carrier moving plate 25 will squeeze away the dustproof strips 30, while the dustproof strips 30 at other positions will remain closed. In this way, the sealing and dustproof performance can be improved without hindering the movement of the moving frame 22.

Embodiment 2

The present embodiment has made certain changes on the basis of embodiment 1, so the same parts and components as that in embodiment 1 adopt the same reference signs, and the detailed description thereof is omitted. The following is only a detailed description of the changed structure.

Referring to FIG. 13 to FIG. 19, the rear panel assembly 6 in the present embodiment includes two parts which are connected with each other in a clamping manner, i.e., a rear cover 41 and a rear cover connecting plate 42. The rear cover connecting plate 42 is approximately Z-shaped, one end of which is connected with the extension part 3*b* through a fastener or bolt, the other end of which is connected with the rear cover 41 in a clamping manner, and the middle portion of which is provided with a vertical side plate 42*a*; the upper end of the rear cover 41 is connected with the upper surface of the connecting section 4. In the present embodiment, the first routing groove 20 is not provided, but a second routing groove 40 is provided in the side plate 42*a* of the rear cover connecting plate 42 and is also provided along the length direction of the cross beam 1, and the cable carrier moving plate 25 extends through the second routing groove 40 into the cavity 28. The sidewall 22*b* of the moving frame 22 is provided with a pass-through hole 22*c*, the cable carrier moving plate 25 is made by bending a sheet metal, and the upper portion extends into the cavity 28 and is connected with the moving end of the cable carrier 29. The cable carrier moving plate 25 is connected to the pass-through hole 22*c* in a semi-enclosed manner, and together with the sidewall 22*b* forms a communicating cavity 32 that communicates the inside of the moving frame 22 and the cavity 28, and the communicating cavity 32 may be used for routing electric wires, air pipes and the like.

In this structure, the electric wire, air pipes and the like sequentially pass through the through hole 22*a* and the communicating cavity 32 from the inside of the box body, enter the cable carrier 29, then sequentially pass through the cable carrier 29, the opening 4*b* and the suspension pipes 2, and finally enter the ceiling 100. In order to improve the sealing and dustproof performance, the following structure may be used: a roller assembly 33 is connected on each of the two sides of the cable carrier moving plate 25, the roller assembly 33 includes a roller support frame 33*a* and two dustproof belt rollers 33*b* provided in parallel on the roller support frame 33*a*, a flexible dustproof belt 34 is mounted at the first routing groove 20, the two ends of the flexible dustproof belt 34 are fixed on the side portion 12*a* of the rear cover plate connecting plate 12 through a pressing plate 35, and the flexible dustproof belt 34 semi-encloses the outside of the cable carrier moving plate 25, passes through the two roller assemblies 33, and fits with four dustproof belt rollers 33*b* of the two roller assemblies 33 (see FIG. 16 for the specific arrangement mode of the flexible dustproof belt 34 and the dustproof belt rollers 33*b*). When the moving frame 22 moves, the cable carrier moving plate 25 forces the flexible dustproof belt 34 to give way, and the flexible dustproof belt 34 at positions slightly away from the cable carrier moving plate 25 can maintain the original state without being deformed, such that the sealing and dustproof performance is improved without hindering the movement of the moving frame 22.

The application at least has the following advantages:

1. Since cables such as electric wires and air pipes within the box body which needs to be moved are collectively mounted within the cable carrier, not only the routing is more tidy, but also the cables can be well protected.
2. Since the front inner cavity and the rear inner cavity for routing and arranging are provided, the arrangement in the front inner cavity and the rear inner cavity is clear and tidy, and is not easily confused.
3. Since the middle portion of the load-bearing beam is not provided with a groove for routing, the influence on the overall strength of the cross beam is smaller and the length of the groove can be increased, so as to prolong the moving distance of the lower box body and facilitate the use.
4. The sealing performance is good, the dustproof effect is good and no influence is caused to the movement of the moving module.
5. Since electric wires, air pipes and the like are all collected in the medical suspension bridge, the appearance is attractive.

Referring to FIG. 20-23, the medical suspension bridge includes a shaft seat 102 and a suspension arm 120. The rotating mechanism of the medical suspension bridge of the application includes a rotating shaft 101, a plastic shaft sleeve 103, a tensioning device 109, a friction device 115, an ejection device 116, a limiting screw 117, and a limiting block 118. The rotating shaft 101 is connected between the shaft seat 102 and the suspension arm 120, the plastic shaft sleeve 103 is connected to the rotating shaft 101, the shaft seat 102 is partially embedded in the plastic shaft sleeve 103, and the rotating shaft 101 drives the suspension arm 120 to rotate relative to the shaft seat 102. The plastic shaft sleeve 103 can reduce the wear of the rotating shaft 101 and the shaft seat 102. The tensioning device 109 is connected to the rotating shaft 101, and the ejection device 116 is provided in the rotating shaft 101. The friction device 115 is provided between the rotating shaft 101 and the plastic shaft sleeve 103, one end of the friction device 115 is fixedly connected with the rotating shaft 101, and the other end presses against the plastic shaft sleeve 103. The friction device 115 can increase the friction force between the rotating shaft 101 and the plastic shaft sleeve 103, such that the suspension arm does not rotate freely relative to the shaft seat 102. The limiting screw 117 is connected with the rotating shaft 101, the limiting block 118 is provided on the shaft seat 102, and the limiting screw 117 is used together with the limiting block 118 to realize the rotation limitation of the rotating shaft 101.

Figure 20:
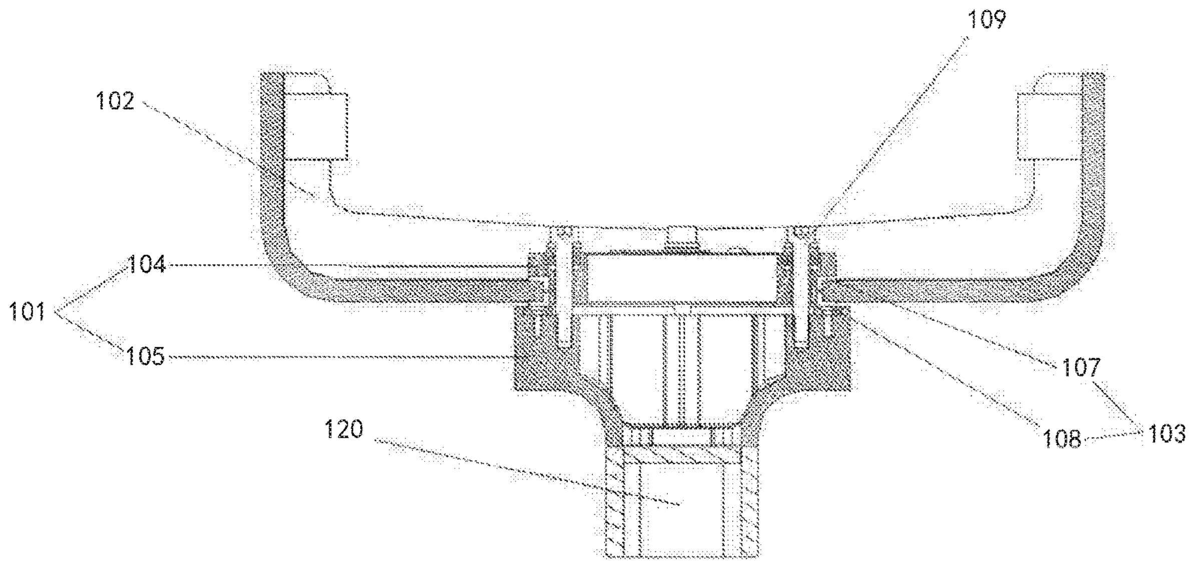
FIG. 20 is a sectional view of a rotating mechanism of the medical suspension bridge in the application.
Figure 21:
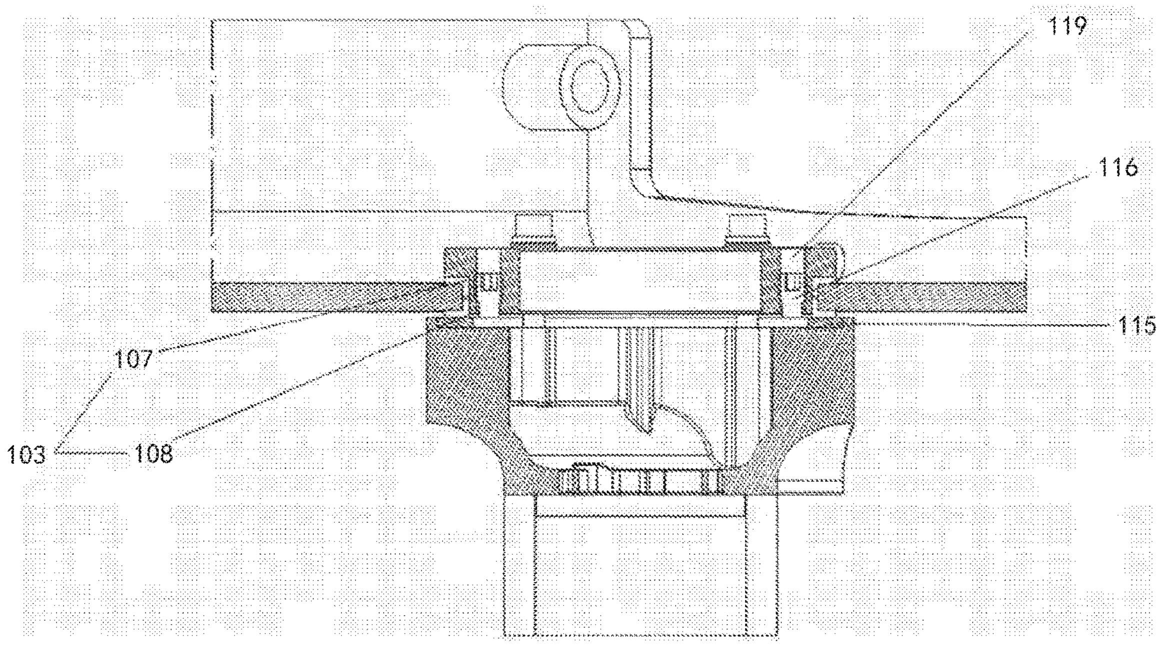
FIG. 21 is a sectional view in another view direction of the rotating mechanism of the medical suspension bridge in the application.

Further referring to FIG. 20 and FIG. 21, the rotating shaft 101 includes an upper shaft member 104 and a lower shaft member 105. The central position of the rotating shaft is provided with a through hole. Such design can not only facilitate routing, but also reduce the weight of the rotating shaft itself. The tensioning device 109 is connected between the upper shaft member 104 and the lower shaft member 105, and the plastic shaft sleeve 103 is clamped between the upper shaft member 104 and the lower shaft member 105, so as to clamp the shaft seat 102 partially embedded in the plastic shaft sleeve 103, such that the rotating shaft 101 is capable of rotating relative to the shaft seat 102. One end of the lower shaft member 105 is fixedly connected with the suspension arm 120, so the suspension arm 120 can rotate with the rotating shaft 101 relative to the shaft seat 102. The upper shaft member 104 is provided with a through hole 119, the ejection device 116 is mounted in the through hole 119, and one end of the ejection device 116 presses against the lower shaft member 105. The clamping force between the upper shaft member 104 and the lower shaft member 105 can be adjusted by adjusting the tightening force of the tensioning device 109 and the ejection device 116, so as to adjust the rotation tightness between the shaft seat 102 and the rotating shaft 101. The plastic shaft sleeve 103 includes an upper shaft sleeve 107 and a lower shaft sleeve 108, the upper shaft sleeve 107 and the lower shaft sleeve 108 are symmetrically provided, the upper shaft sleeve 107 is provided between the upper shaft member 104 and the shaft seat 102, the lower shaft sleeve 108 is provided between the lower shaft member 105 and the shaft seat 102, and one end of the lower shaft sleeve 108 presses against the friction device 115. The plastic shaft sleeve 103 is divided into an upper shaft sleeve 107 and a lower shaft sleeve 108 to facilitate mounting.

Figure 22:
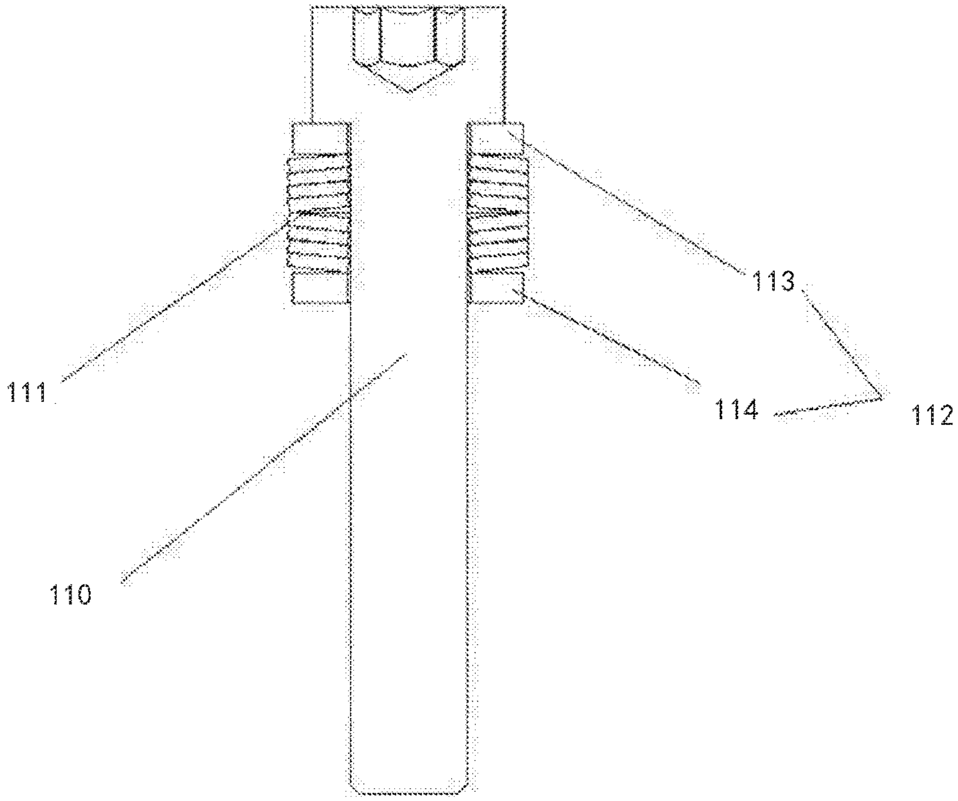
FIG. 22 is a schematic structural view of a tensioning device.
Figure 23:
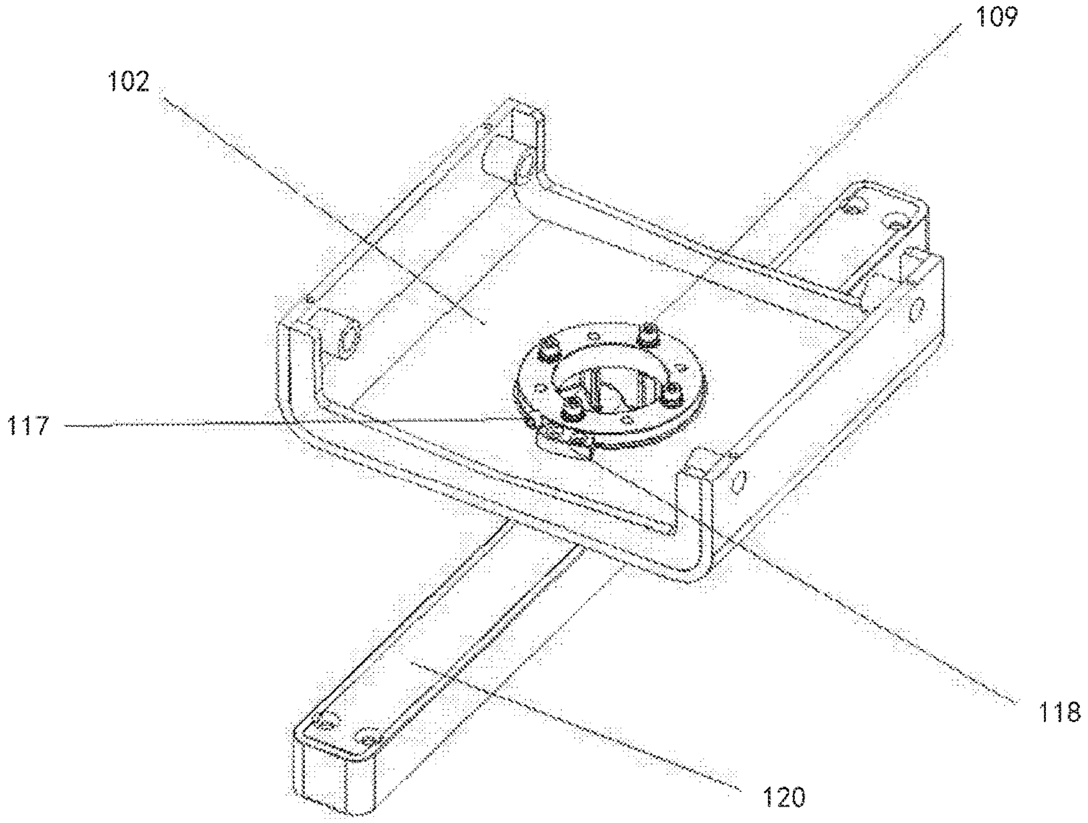
FIG. 23 is a schematic three-dimensional structural view of a rotating mechanism of the medical suspension bridge in the application.

Further referring to FIG. 20 and FIG. 22, the tensioning device 109 includes a tensioning screw 110, a disc spring assembly 111, and a gasket 112. The tensioning screw 110 passes through the upper shaft member 104 and is connected with the lower shaft member 105, and the disc spring assembly 111 and the gasket 112 are provided on the tensioning screw 110 in a sleeving manner. The gasket 112 includes a first gasket 113 and a second gasket 114. The first gasket 113 and the second gasket 114 are respectively provided at the two ends of the disc spring assembly 111, and respectively press against a nut of the tensioning screw 110 and the upper shaft member 104. The gasket 112 can reduce the wear of the disc spring assembly 111. When the tensioning screw 110 is locked, the disc spring assembly 111 will be compressed, such that the tightening force between the upper shaft member 104 and the lower shaft member 105 can be adjusted conveniently. Moreover, when the plastic shaft sleeve 103 is worn to a certain extent, the disc spring assembly 111 can automatically compensate for the wear and ensure that the rotation torque changes little.

The rotating mechanism of the medical suspension bridge provided by the application uses the plastic shaft sleeve to replace the metal bearing, the cost is reduced, and the rotation tightness can be adjusted.

Figure 24:
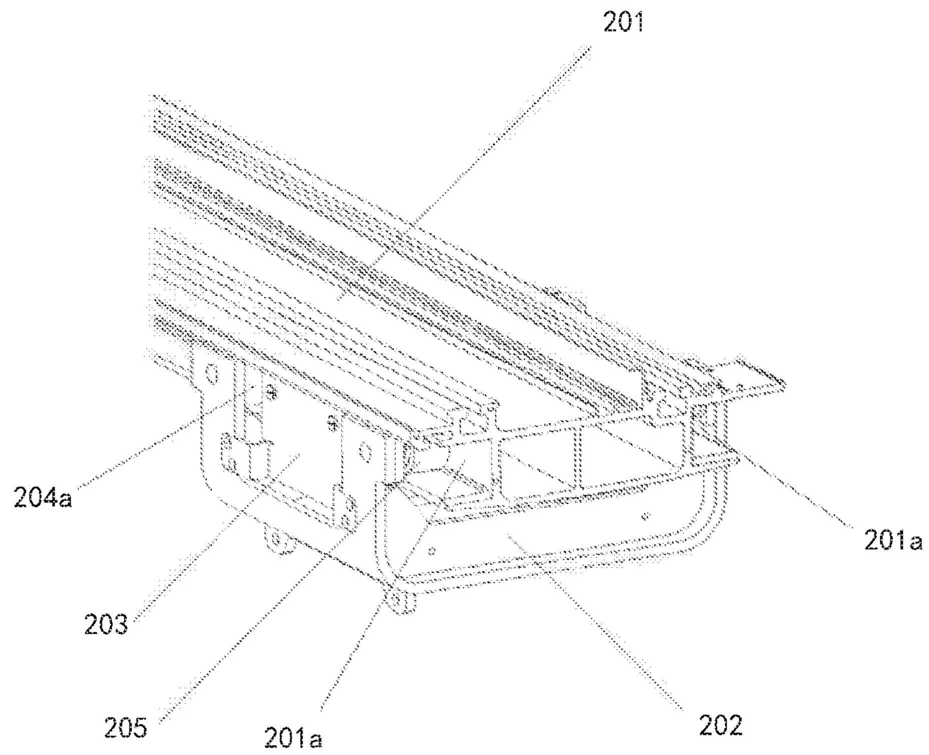
FIG. 24 is a schematic structural view of an airbag brake mechanism of the medical suspension bridge in the application.

Referring to FIG. 24, it illustrates an airbag brake mechanism of the medical suspension bridge according to one preferred embodiment of the application, which includes a guide rail 201, a moving module 202 movably connected to the guide rail 201 and an airbag brake module 203 mounted on the moving module 202.

Figure 25:
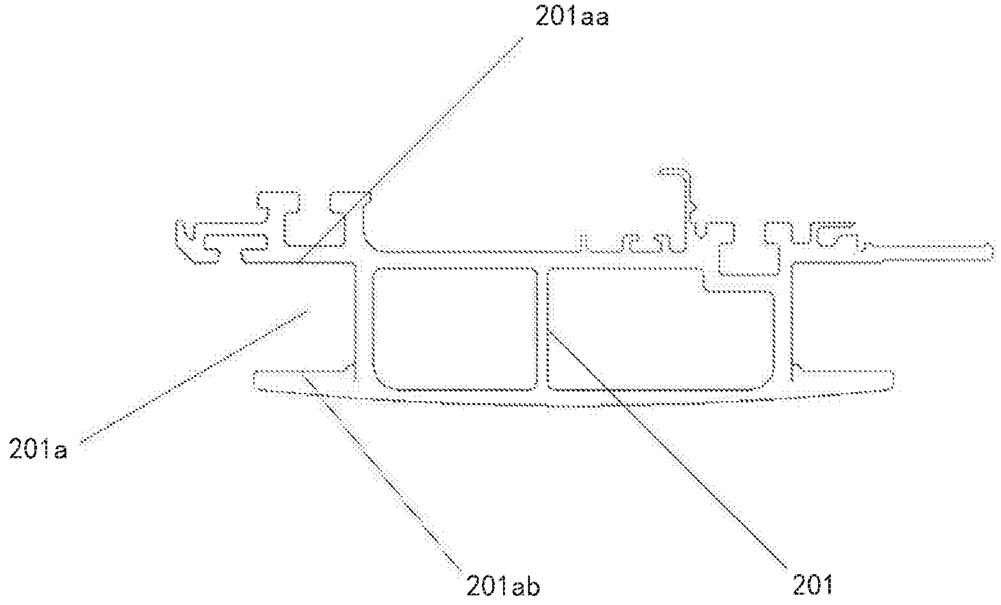
FIG. 25 is a schematic cross-sectional view of a guide rail in FIG. 24.
Figure 26:
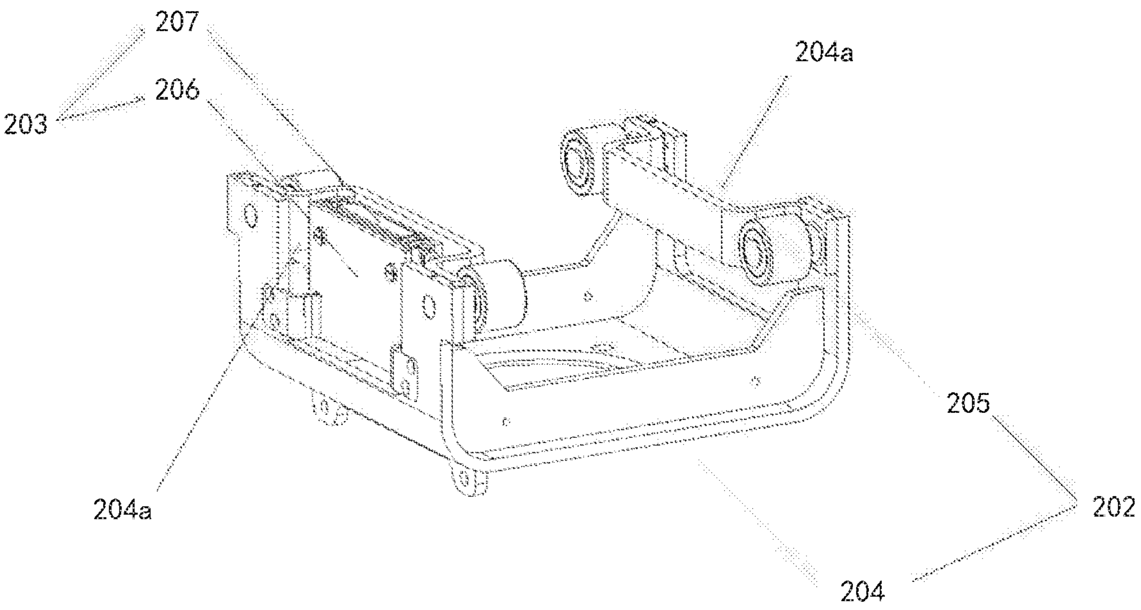
FIG. 26 is a schematic structural view after the guide rail in FIG. 24 is removed.
Figure 27:
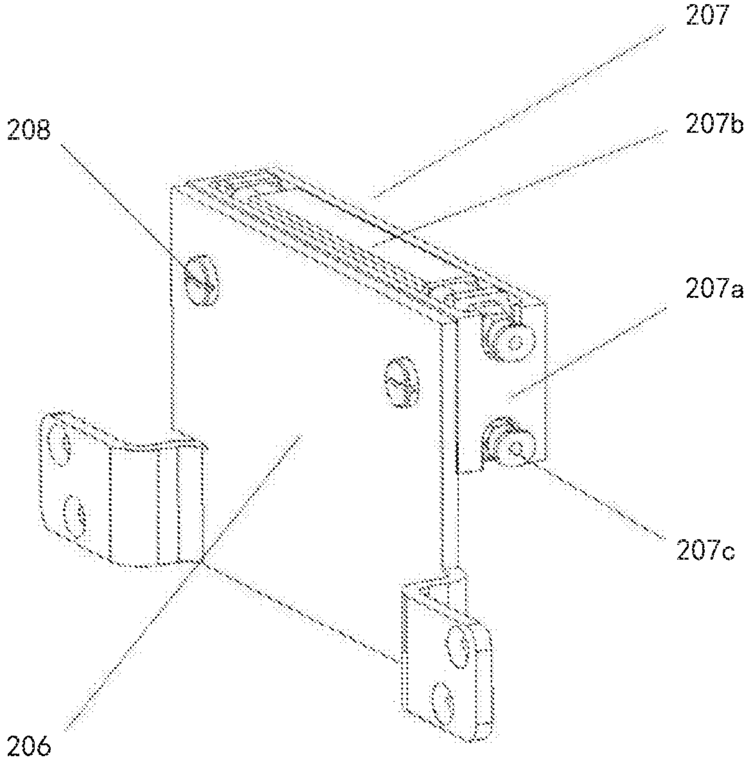
FIG. 27 is a schematic structural view of an airbag brake module in the application.

Referring to FIG. 25 to FIG. 27, the guide rail 201 is preferably an aluminum section guide rail, guide rail grooves 201*a* are symmetrically provided in the two sides, and each guide rail groove 201*a* includes an upper sidewall 201*aa* and a lower sidewall 201*ab* which are provided opposite to each other. The moving module 202 includes a moving frame 204 with a U-shaped cross section and four moving rollers 205 symmetrically provided on the moving frame 204. The moving rollers 205 are clamped in the guide rail grooves 201*a*, and fit with the upper sidewall 201*aa* and the lower sidewall 201*ab* of the guide rail grooves 201*a*. The moving module 202 is connected to the guide rail 201 through the moving rollers 205, and moves along the guide rail grooves 201*a* through the moving rollers 205.

The two sides of the moving frame 204 are symmetrically provided with mounting ports 204*a*, and the airbag brake module 203 is mounted in the mounting ports 204*a*. The airbag brake module 203 includes an airbag brake support frame 206 and an airbag brake 207. The airbag brake support frame 206 is fixedly connected to the moving frame 204 through screws, the airbag brake 207 is mounted on the airbag brake support frame 206 through the shaft shoulder screw 208, and the airbag brake 207 is located in the guide rail grooves 201*a*.

Figure 28:
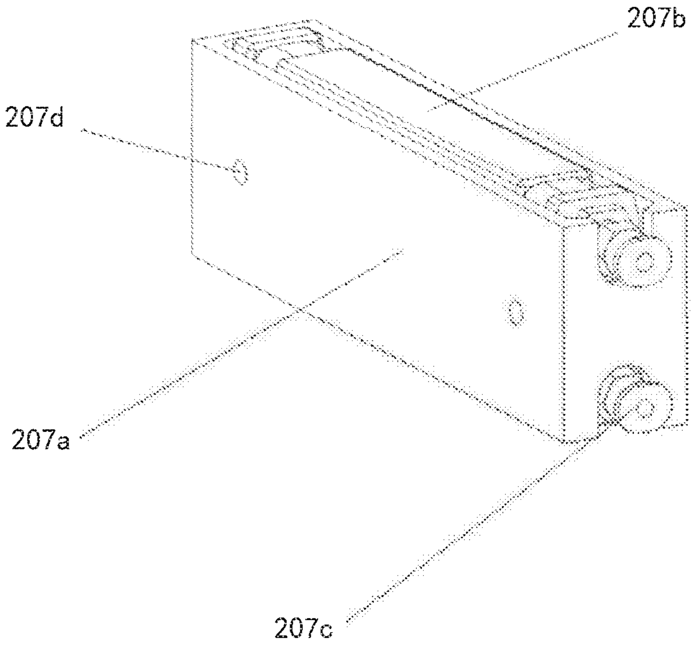
FIG. 28 is a schematic structural view of an airbag brake in the application.
Figure 29:
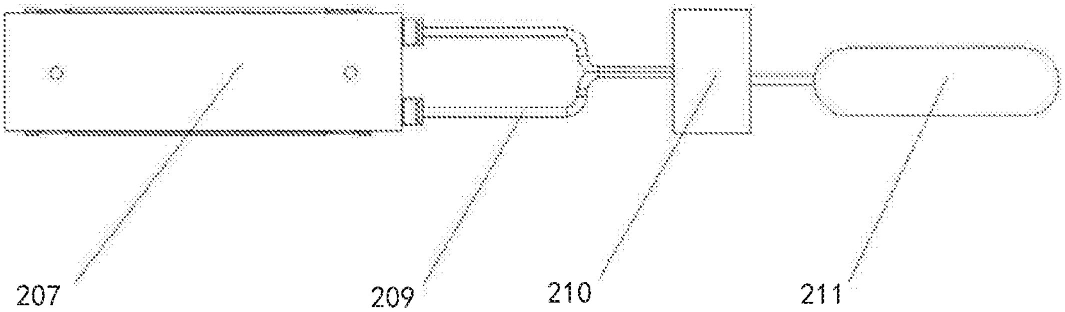
FIG. 29 is a schematic view of connection between an airbag brake, an air pipe, an electromagnetic valve and an air source in the application.
Figure 30:
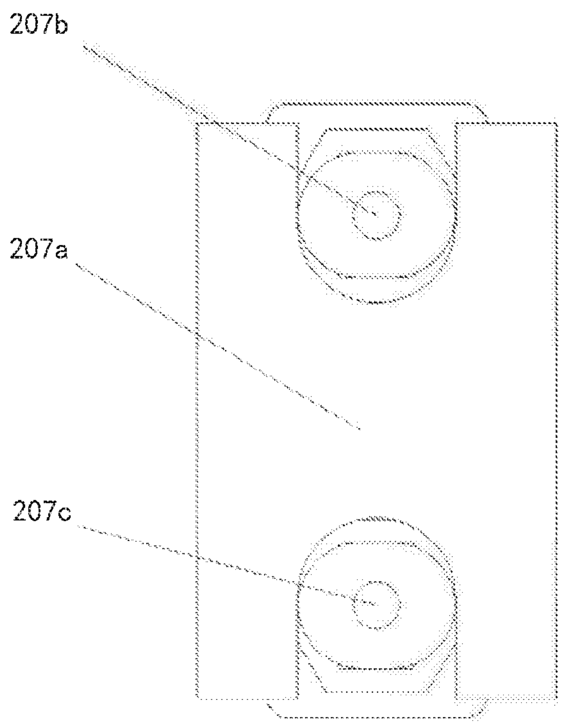
FIG. 30 is a schematic planar view of an airbag brake in the application.

Referring to FIG. 28 to FIG. 30, the airbag brake 207 includes a base 207*a*, an upper airbag 207*b* provided on the upper portion of the base 207*a*, and a lower airbag 207*c* provided at the lower portion of the base 207*a*. The upper airbag 207*b* and the lower airbag 207*c* are connected with an air source 211 through an air pipe 209, and an electromagnetic valve 210 is provided on the air pipe 209 to control the upper airbag 207*b* and the lower airbag 207*c* to deflate or the air source 211 to inflate the upper airbag 207*b* and the lower airbag 207*c*. When the upper airbag 207*b* is mounted in the base 207*a*, it may protrude or not protrude out of the upper surface of the base 207*a*, but after being expanded by inflation, part of the upper airbag 207*b* will protrude out of the upper surface of the base 207*a* and press against the upper sidewall 201*aa*. Similarly, when the lower airbag 207*c* is mounted in the base 207*a*, it may also protrude or not protrude out of the lower surface of the base 207*a*. However, after being expanded by inflation, part of the lower airbag 207*c* will protrude out of the upper surface of the base 207*a* and press against the lower sidewall 201*ab*. Under normal conditions (when the moving module does not need to move), the upper airbag 207*b* and lower airbag 207*c* of the airbag brake 207 are in an inflated state, they press against the upper sidewall 201*a* and the lower sidewall 201*ab* of the guide rail grooves 201*a*, so as to fix the moving module 202 on the guide rail 201. When the moving module 202 needs to move, the electromagnetic valve 210 is used to control the upper airbag 207*b* and the lower airbag 207*c* to deflate, such that the upper airbag 207*b* and the lower airbag 207*c* are separated from the guide rail grooves 201*a*. At this time, the moving module 202 can be pushed to move on the guide rail 201.

Figure 31:
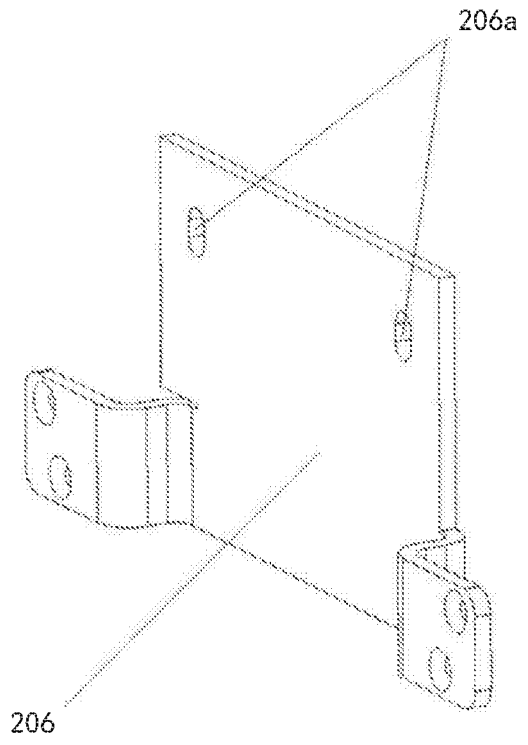
FIG. 31 is a schematic structural view of an airbrake support frame in the application.
Figure 32:
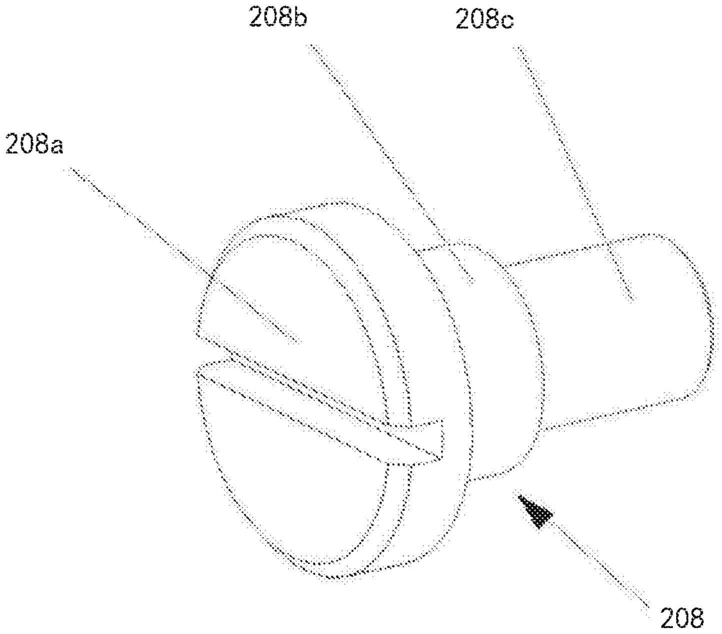
FIG. 32 is a schematic structural view of a shaft shoulder screw in the application.

Referring to FIG. 28, FIG. 31 and FIG. 32, the specific connection mode of the airbag brake 207 and the airbag brake support frame 206 is as follows: two elongated holes 206*a* provided in the vertical direction are provided in the airbag brake support frame 206, two screw holes 207*d* for mounting are provided in the base 207*a* of the airbag brake 207, the shaft shoulder screw 208 is provided with a shaft shoulder 208*b* between a screw head 208*a* and a threaded part 208*c*, and the shaft shoulder 208*b* fits with the elongated hole 206*a*. The shaft shoulder screw 208 passes through the elongated hole 206*a* and is in threaded connection with the threaded hole 207*d*. After connection, the airbag brake 207 can slide freely along the elongated hole 206*a* through the shaft shoulder screw 208, that is, the airbag brake 207 is float-connected to the airbag brake support frame 206. The advantage of this structure lies in that the requirement on the size accuracy of the guide rail 201 and the airbag brake 207 is low. When the upper airbag 207*b* and the lower airbag 207*c* of the airbag brake 207 respectively press against the upper sidewall 201*aa* and the lower sidewall 201*ab* of the guide rail grooves 201*a*, the position of the airbag brake 207 can be adjusted freely in the elongated hole 206*a* to adapt to the mounting and size error of the guide rail 201 and the airbag brake 207, such that the upper airbag 207*b* and the lower airbag 207*c* can respectively fit with the upper sidewall 201*aa* and the lower sidewall 201*ab* of the guide rail grooves 201*a* more closely, and the reliability and stability of the brake are improved.

In order to prevent the airbag brake 207 from moving downwards under the effect of gravity after deflation, resulting in contact between the base 207*a* and the lower sidewall 201*ab*, such that the noise is increased and the use is influenced during movement, the size may be designed such that the base 207 is not in contact with the lower sidewall 201*ab* when the base 207*a* is located at the bottom portion, or a part still protrudes out of the lower surface after the lower airbag 207*c* is deflated, such that the soft airbag rubs the lower sidewall 201*ab*, which can effectively reduce the frictional resistance and noise.

The airbag brake mechanism of the medical suspension bridge of the application at least includes the following advantages:

1. When braking, the airbag brake mechanism of the application has two airbag surfaces squeezing the guide rail grooves, so the friction force is larger, the braking effect is better, and the unexpected drift of the moving module is effectively prevented.
2. The airbag brake mechanism of the application is float-connected to the airbag brake support frame, the requirements on the size and mounting accuracy of the guide rail and the airbag brake are low, and it is more convenient and reliable to use.
3. The friction noise is low when the moving module of the application moves.

Figure 33:
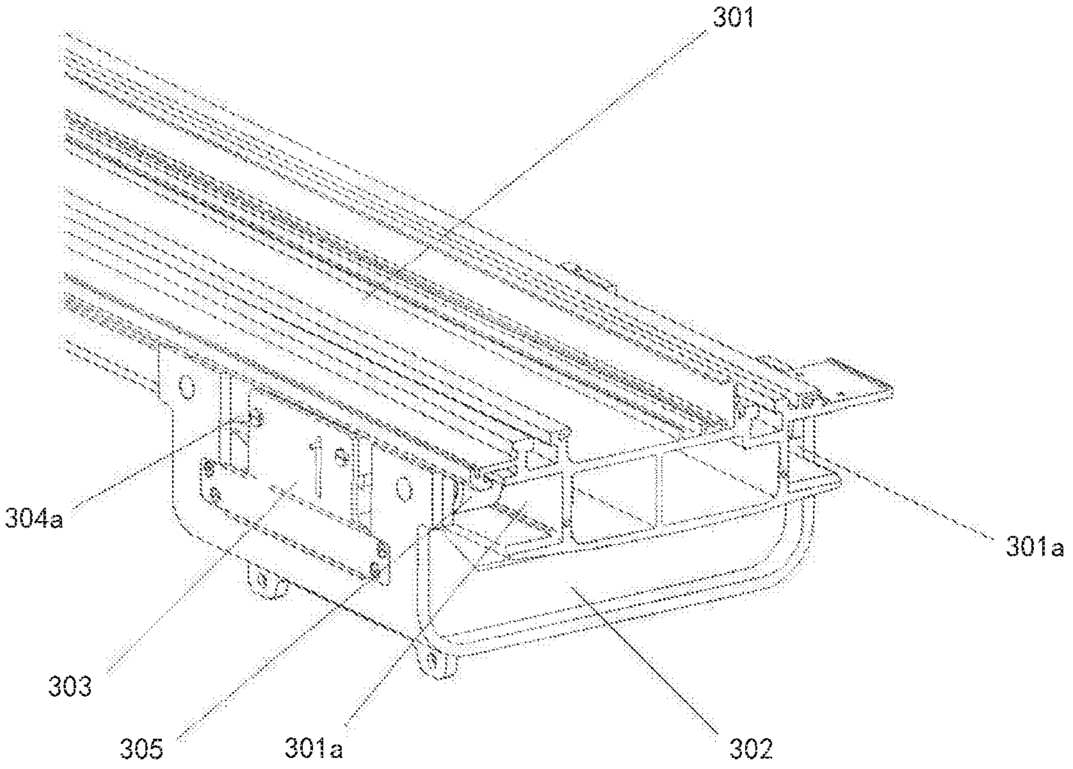
FIG. 33 is a schematic structural view of an electromagnetic brake mechanism of the medical suspension bridge in the application.

Referring to FIG. 33, it illustrates an electromagnetic brake mechanism of the medical suspension bridge according to one preferred embodiment of the application, which includes a guide rail 301, a moving module 302 movably connected to the guide rail 301, and an electromagnetic brake module 303 mounted on the moving module 302.

Figure 34:
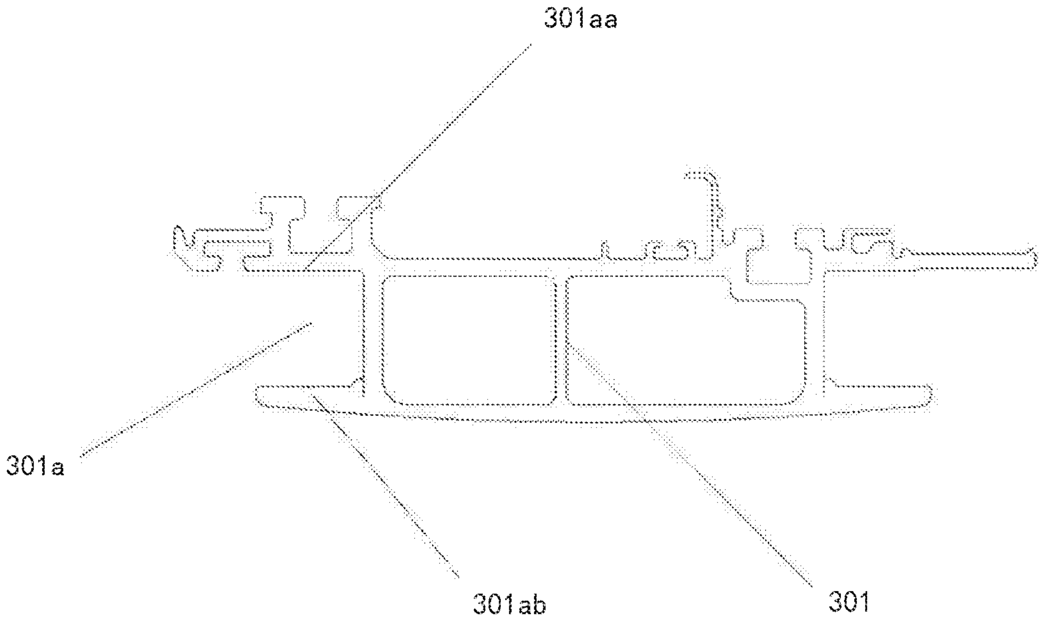
FIG. 34 is a schematic cross-sectional view of a guide rail in FIG. 33.
Figure 35:
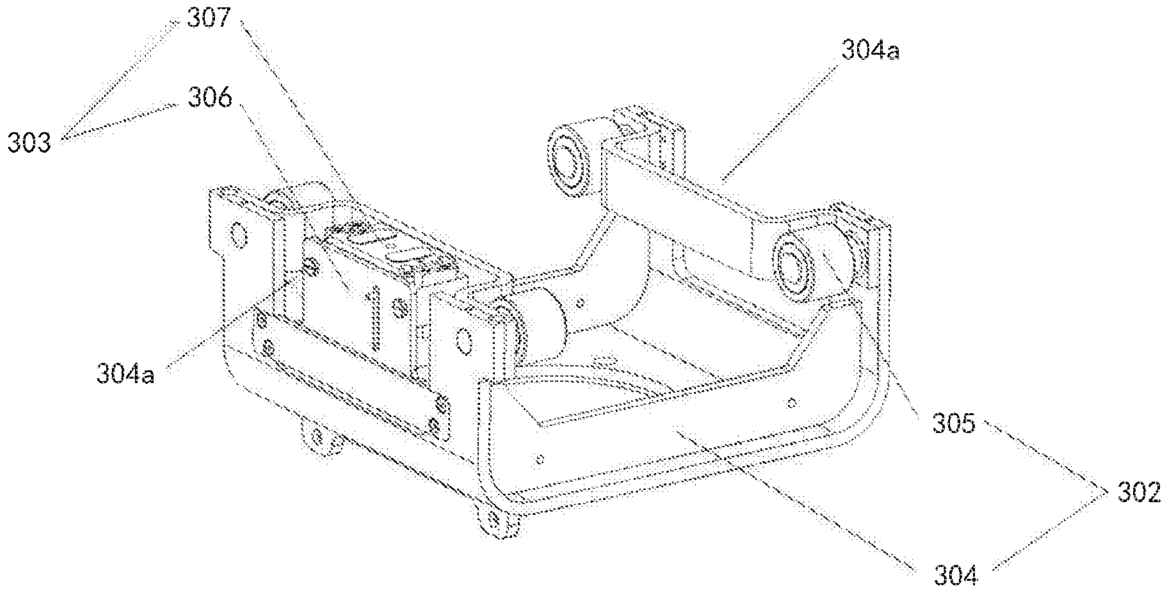
FIG. 35 is a schematic structural view after the guide rail in FIG. 33 is removed.
Figure 36:
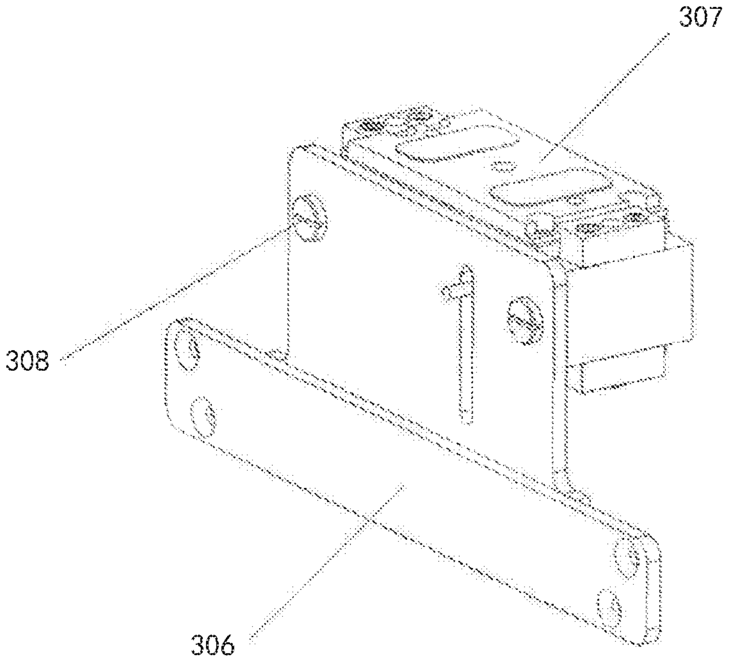
FIG. 36 is a schematic structural view of an electromagnetic brake module in the application.

Referring to FIG. 34 to FIG. 36, the guide rail 301 is preferably an aluminum section guide rail, guide rail grooves 301*a* are symmetrically provided in the two sides, and each guide rail groove 301*a* includes an upper sidewall 301*aa* and a lower sidewall 301*ab*. The moving module 302 includes a moving frame 304 with a U-shaped cross section and four moving rollers 305 symmetrically provided on the moving frame 304. The moving rollers 305 are provided in the guide rail grooves 301*a* in a clamping manner, and fit with the upper sidewall 301*aa* and the lower sidewall 301*ab* of the guide rail grooves 301*a*. The moving module 302 is connected to the guide rail 301 through the moving rollers 305, and moves along the guide rail grooves 301*a* through the moving rollers 305.

The two sides of the moving frame 304 are symmetrically provided with mounting ports 304*a*, and the electromagnetic brake module 303 is mounted in the mounting ports 304*a*. The electromagnetic brake module 303 includes an electromagnetic brake support frame 306 and an electromagnetic brake 307. The electromagnetic brake support frame 306 is fixedly connected to the moving frame 304 through screws, the electromagnetic brake 307 is mounted on the electromagnetic brake support frame 306 through the shaft shoulder screw 308, and the electromagnetic brake 307 is located in the guide rail grooves 301*a*.

Figure 37:
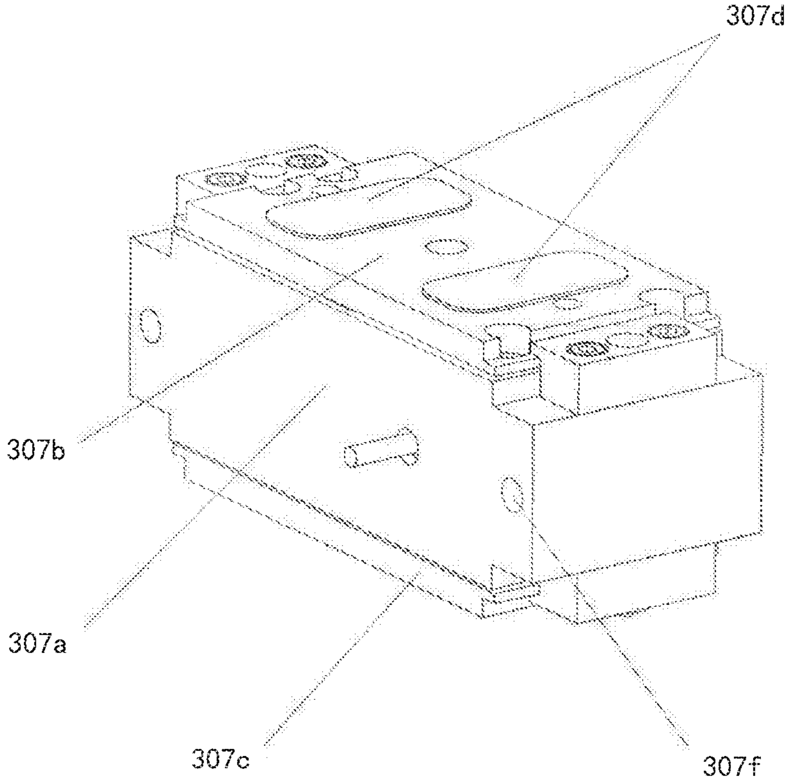
FIG. 37 is a schematic structural view of an electromagnetic brake in the application.
Figure 38:
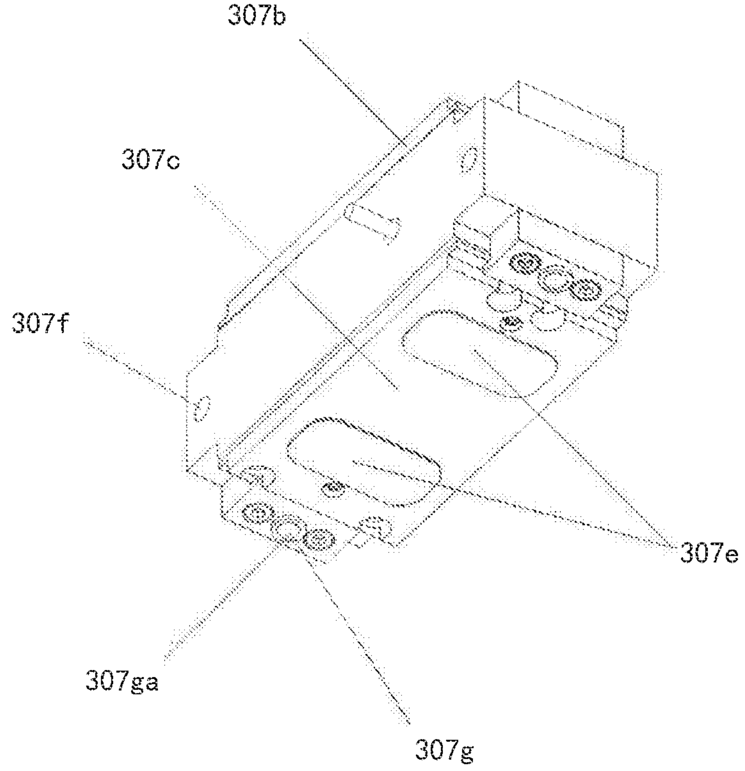
FIG. 38 is a schematic structural view in another view direction of the electromagnetic brake in the application.

Referring to FIG. 37 to FIG. 38, the electromagnetic brake 307 includes a base 307*a*, a coil (not shown) provided in the base 307*a*, an upper armature 307*b* and a lower armature 307*c* respectively provided on the upper side and the lower side of the base 307*a*, and a plurality of compression springs (not shown) provided in the base and including the two ends which respectively press against the upper armature 307*b* and the lower armature 307*c*. When the coil is not electrified, the upper armature 307*b* and the lower armature 307*c* extend out under the effect of elastic force and respectively press against the upper sidewall 301*aa* and the lower sidewall 301*ab* of the guide rail grooves 301*a*, so as to fix the moving module 302 on the guide rail 301. When the coil is electrified, attracting force is produced to the upper armature 307*b* and the lower armature 307*c*, such that the upper armature 307*b* and the lower armature 307*c* will retract by overcoming the elastic force. At this time, the moving module 302 can be pushed to move on the guide rail 301.

In order to enhance the braking force of the electromagnetic brake 307 and the guide rail 301, an upper friction plate 307*d* and a lower friction plate 307*e* are respectively provided on the upper armature 307*b* and the lower armature 307*c*.

Figure 39:
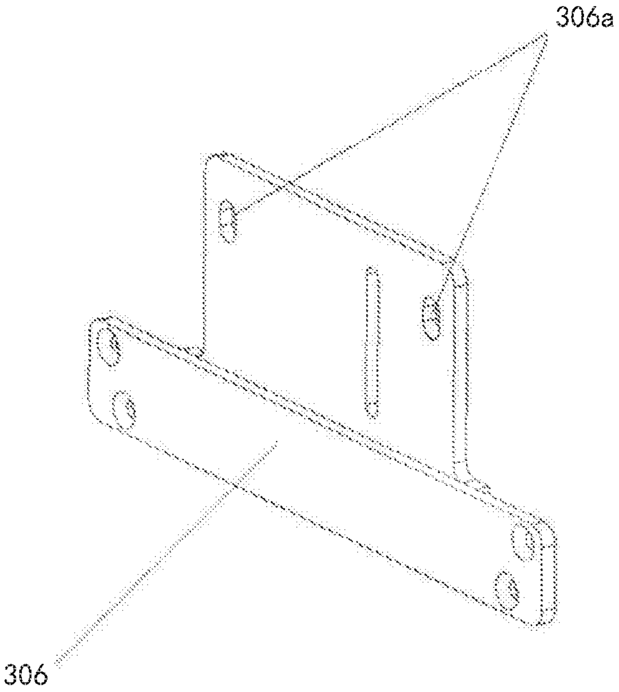
FIG. 39 is a schematic structural view of an electromagnetic brake support frame in the application.
Figure 40:
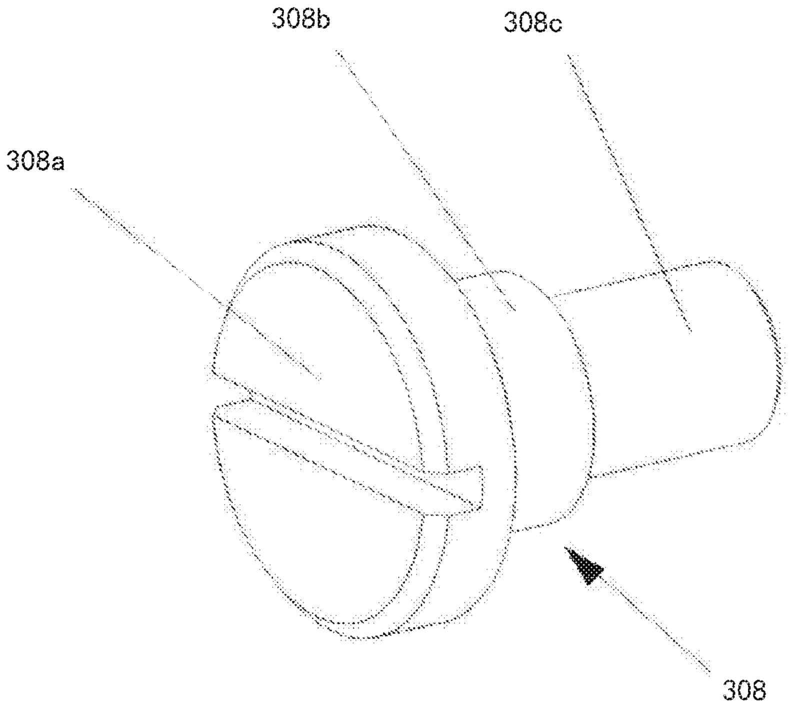
FIG. 40 is a schematic structural view of a shaft shoulder screw in the application.

Referring to FIG. 39 to FIG. 40, the specific connection mode of the electromagnetic brake 307 and the electromagnetic brake support frame 306 is as follows: two elongated holes 306*a* provided in the vertical direction are provided in the electromagnetic brake support frame 306, two threaded holes 307*f* for mounting are provided in the electromagnetic brake 307, the shaft shoulder screw 308 is provided with a shaft shoulder 308*b* between a screw head 308*a* and a threaded part 308*c*, and the shaft shoulder 308*b* fits with the elongated holes 306*a*. The shaft shoulder screws 308 penetrate through the elongated holes 306*a* and are in threaded connection with the threaded holes 307*f* After connection, the electromagnetic brake 307 can slide freely along the elongated holes 306*a* through the shaft shoulder screws 308. The advantage of this structure lies in that the requirement on the size accuracy of the guide rail 301 and the electromagnetic brake 307 is low. When the upper armature 307*b* and the lower armature 307*c* of the electromagnetic brake 307 respectively press against the upper sidewall 301*aa* and the lower sidewall 301*ab* of the guide rail grooves 301*a*, the position of the electromagnetic brake 307 can be adjusted in the elongated holes 306*a* to adapt to the mounting and size error of the guide rail 301 and the electromagnetic brake 307, such that the upper friction plate 307*d* and the lower friction plate 307*e* can respectively fit with the upper sidewall 301*aa* and the lower sidewall 301*ab* of the guide grooves 301*a* more closely, and the reliability and stability of the brake are improved.

Figure 41:
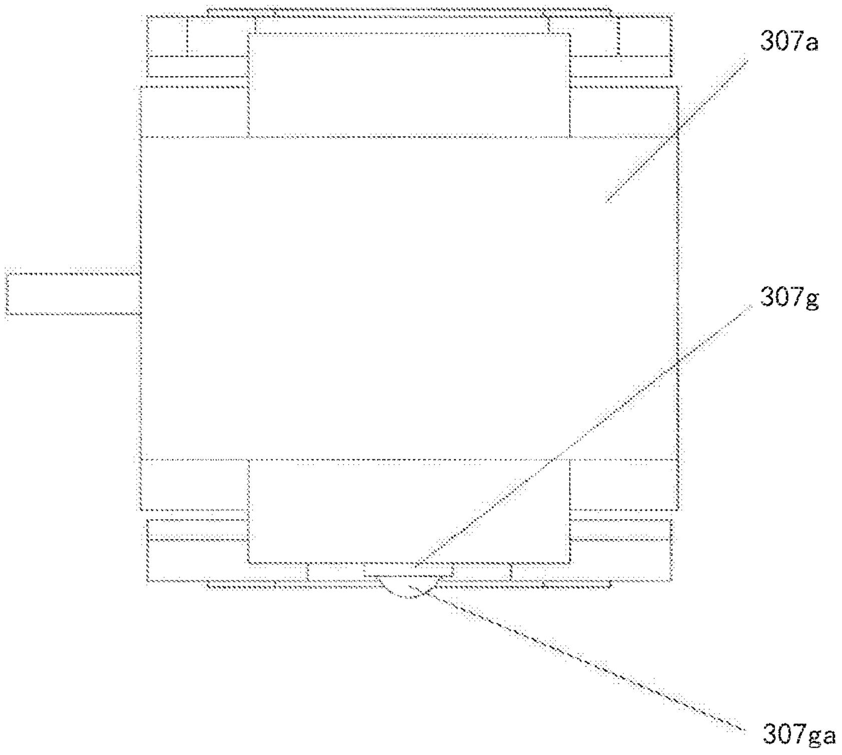
FIG. 41 is a schematic planar view of an electromagnetic brake in the application.

Referring to FIG. 38 and FIG. 41, in order to prevent the electromagnetic brake 307 from moving downwards under the effect of gravity after the coil is electrified, resulting in friction between the lower friction plate 307*e* and the lower sidewall 301*ab*, such that the use is influenced, a ball plunger 307*g* is mounted on the lower surface of the base 307*a*. A ball head 307*ga* at the top of the ball plunger 307*g* is in contact with the lower sidewall 301*ab* when the lower armature 307*c* is retracted, so as to prevent the lower friction plate 307*e* from being in contact with the lower sidewall 301*ab*. When the moving module 302 is pushed to move, the ball head 307*ga* rolls, the moving module 302 can be pushed to move by applying very small force, and no friction noise is produced.

The electromagnetic brake mechanism of the medical suspension bridge of the application at least has the following advantages:

1. In the medical suspension bridge provided by the application, by changing the traditional airbag brake into the electromagnetic brake, the response speed is fast, the use reliability is high, it is not easily damaged, the service life is longer, no compressed air is used to drive, the structure is simple and the volume is small.
2. Since the electromagnetic brake mechanism of the application is provided with the upper armature and the lower armature, which can press against the guide rail grooves to play a role of braking, the braking effect is better than that of a unilateral armature.
3. Since the electromagnetic brake of the application is movably connected with the electromagnetic brake support frame, the requirements on the size and mounting accuracy of the guide rail and the electromagnetic brake are low, and it is more convenient and reliable to use.
4. Since the friction plate is not in contact with the guide rail when the moving module moves, the friction noise is low.

It should be pointed out that the above preferred embodiments are only used for describing the technical concept and features of the application, for the purpose of making people familiar with the technology understand the content of the application and implement it accordingly, and shall not limit the scope of protection of the application. All equivalent changes or modifications made according to the essence of the application shall be covered within the scope of protection of the application.

The invention claimed is:

1. A medical suspension bridge, comprising a cross beam, a suspension pipe, a moving module and a box body connected with the moving module, the cross beam being connected with the suspension pipe, the moving module being movably connected with the cross beam, wherein the medical suspension bridge further comprises a cable carrier, electric wires and air pipes, the cross beam comprises a load-bearing beam, the moving module comprises a cable carrier moving plate extending to the upper portion of the load-bearing beam, one end of the cable carrier is connected to the load-bearing beam, the other end is connected to the cable carrier moving plate, the electric wires and the air pipes enter the suspension pipe through the moving module and the cable carrier from the inside of the box body;

wherein the cross beam further comprises a rear panel assembly connected to one side of the load-bearing beam;

wherein the rear panel assembly comprises a rear cover plate connecting plate connected with the load-bearing beam, the load-bearing beam is provided with an outwards convex extension part, the rear cover plate connecting plate is provided with an outwards convex fitting part, and the fitting part and the extension part are connected with each other in a clamping manner;

wherein a first groove is provided in the fitting part, a second groove is provided in the extension part, the first groove and the second groove run through each other to jointly form a first routing groove that avoids the cable carrier moving plate, and the cable carrier moving plate extends through the first routing groove to the upper portion of the load-bearing beam.

2. The medical suspension bridge according to claim 1, wherein two dustproof strips which jointly seal the first routing groove are mounted at the first routing groove.

3. The medical suspension bridge according to claim 1, wherein the rear panel assembly further comprises a rear cover plate and a rear panel, the rear cover plate, the rear cover plate connecting plate and the rear panel are connected with one another in a clamping manner, and a rear inner cavity is formed among the rear cover plate, the rear cover plate connecting plate and the rear panel.

4. The medical suspension bridge according to claim 1, wherein the cross beam further comprises a front panel assembly connected to the other side of the load-bearing beam, the front panel assembly comprises a front cover plate and a front panel connected with each other in a clamping manner, and the front cover plate and the front panel fit with each other to form a front inner cavity.

5. The medical suspension bridge according to claim 1, wherein the rear panel assembly comprises a rear cover and a rear cover connecting plate connected with each other in a clamping manner, the rear cover connecting plate is provided with a side plate, the side plate is provided with a second routing groove that avoids the cable carrier moving plate, and one end of the cable carrier moving plate extends through the second routing groove to the upper portion of the load-bearing beam.

6. The medical suspension bridge according to claim 5, wherein the two sides of the cable carrier moving plate are connected with roller assemblies, a flexible dustproof belt covering the second routing groove is mounted on a side portion of the rear cover plate connecting plate, and the flexible dustproof belt passes through the roller assemblies and semi-encloses the outside of the cable carrier moving plate.

7. The medical suspension bridge according to claim 6, wherein each roller assembly comprises a roller support frame and at least one dustproof belt roller mounted on the roller support frame.

8. The medical suspension bridge according to claim 1, wherein the medical suspension bridge further comprises a rotating mechanism, a shaft seat and a suspension arm, the suspension arm is rotatably connected to the shaft seat through the rotating mechanism, the rotating mechanism comprises a rotating shaft and a plastic shaft sleeve, the plastic shaft sleeve is connected to the rotating shaft, the shaft seat is partially embedded in the plastic shaft sleeve, and the rotating shaft drives the suspension arm to rotate relative to the shaft seat.

9. The medical suspension bridge according to claim 1, wherein the medical suspension bridge further comprises an airbag brake mechanism, the airbag brake mechanism comprises a guide rail, a moving module movably connected to the guide rail and an airbag brake module fixedly connected with the moving module, the guide rail is provided with guide rail grooves, the airbag brake module comprises an airbag brake located in the guide rail grooves, each guide rail groove comprises an upper sidewall and a lower sidewall which are provided opposite to each other, and the airbag brake tightly presses against the upper sidewall and the lower sidewall during braking.

10. The medical suspension bridge according to claim 9, wherein the airbag brake comprises a base, and an upper airbag and a lower airbag respectively provided at the upper portion and lower portion of the base.

11. The medical suspension bridge according to claim 1, wherein the medical suspension bridge further comprises an electromagnetic brake mechanism, the electromagnetic brake mechanism comprises a guide rail, a moving module movably connected to the guide rail, and an electromagnetic brake module fixedly connected with the moving module, the guide rail is provided with guide rail grooves, and the electromagnetic brake module comprises an electromagnetic brake located in the guide rail grooves.

12. The medical suspension bridge according to claim 11, wherein each guide rail groove comprises an upper sidewall and a lower sidewall provided opposite to each other, the electromagnetic brake comprises an upper armature, a lower armature and a compression spring provided between the upper armature and the lower armature, the upper armature is capable of pressing against the upper sidewall under the elastic force of the compression spring, and the lower armature is capable of pressing against the lower sidewall under the elastic force of the compression spring.

* * * * *